US012585041B2

(12) United States Patent
Perrillat-Bottonet et al.

(10) Patent No.: US 12,585,041 B2
(45) Date of Patent: Mar. 24, 2026

(54) OPTICAL COMPONENT WITH AN ENCAPSULATED METASURFACE AND METHOD FOR MANUFACTURING SUCH A COMPONENT

(71) Applicant: COMMISSARIAT A L'ENERGIE ATOMIQUE ET AUX ENERGIES ALTERNATIVES, Paris (FR)

(72) Inventors: Thomas Perrillat-Bottonet, Grenoble (FR); Sebastien Becker, Grenoble (FR); Quentin Abadie, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 714 days.

(21) Appl. No.: 17/904,325

(22) PCT Filed: Feb. 16, 2021

(86) PCT No.: PCT/FR2021/050268
§ 371 (c)(1),
(2) Date: Aug. 16, 2022

(87) PCT Pub. No.: WO2021/165608
PCT Pub. Date: Aug. 26, 2021

(65) Prior Publication Data
US 2023/0079303 A1 Mar. 16, 2023

(30) Foreign Application Priority Data
Feb. 19, 2020 (FR) ........................................ 2001657

(51) Int. Cl.
*G02B 1/00* (2006.01)
*G02B 1/10* (2015.01)
(Continued)

(52) U.S. Cl.
CPC .............. *G02B 1/00* (2013.01); *G02B 1/002* (2013.01); *G02B 1/10* (2013.01); *G02B 1/11* (2013.01); *G02B 5/00* (2013.01)

(58) Field of Classification Search
None
See application file for complete search history.

(56) References Cited

U.S. PATENT DOCUMENTS 7,742,662 B2 * 6/2010 Cunningham ....... G01N 21/253
385/12
2009/0148955 A1 * 6/2009 Cunningham ....... G02B 5/1809
436/164
(Continued)

FOREIGN PATENT DOCUMENTS

WO WO 2018/140502 A1 8/2018
WO WO 2019/222070 A1 11/2019
WO WO 2020/033930 A2 2/2020

OTHER PUBLICATIONS

International Search Report issued May 10, 2021, in PCT/FR2021/050268 filed Feb. 16, 2021, 2 pages.

*Primary Examiner* — Dung T Nguyen
(74) *Attorney, Agent, or Firm* — Oblon, McClelland, Maier & Neustadt, L.L.P.

(57) ABSTRACT

A metasurface optical component including a first substrate, a set of subwavelength structures for forming a metasurface optic and a layer, referred to as an encapsulation layer, that is substantially parallel to the surface of the first substrate, the encapsulation layer being spaced apart from the set of structures by a space referred to as the encapsulated space, the encapsulation layer and the encapsulated space together forming a multilayer antireflective coating in the given wavelength range.

16 Claims, 13 Drawing Sheets

(51) Int. Cl.
  G02B 1/11    (2015.01)
  G02B 5/00    (2006.01)

(56)      References Cited

U.S. PATENT DOCUMENTS

2018/0217395 A1  8/2018 Lin et al.
2019/0301025 A1  10/2019 Akselrod et al.

* cited by examiner

100

103
102 d

100

103
102 d

100

OPTICAL COMPONENT WITH AN ENCAPSULATED METASURFACE AND METHOD FOR MANUFACTURING SUCH A COMPONENT

TECHNICAL FIELD

The invention relates to the field of optical components, in particular optical components using metasurfaces.

Thus, the invention relates to a metasurface optical component and a method for manufacturing such a component.

PRIOR ART

Metasurface optical components are based on an arrangement of subwavelength structures in order to locally manipulate the phase of the wave and thus modify the wavefront according to a desired profile. This offers the possibility of providing ultrathin optical components having properties that cannot be obtained with classic refractive optical components.

In particular, these optical components are of primary interest in the context of room-temperature infrared imaging. Indeed, in order to compensate for the low sensitivity of room-temperature infrared detectors, it is necessary to use large-aperture optical systems (approximately f/1), which are relatively complex and costly. The use of metasurface optical components may make it possible to simplify such optical systems and reduce the costs thereof, in particular by making it possible to compensate for optical aberrations or by providing focusing functions.

For additional information concerning such optical components and the methods allowing them to be manufactured, reference may be made to the work of A. She and his coauthors published in the scientific journal "Optics express", volume 26, number 2, pages 1573 to 1585.

Nevertheless, although such metasurface optical components are particularly beneficial, they are not necessarily easy to use, due to the size of subwavelength structures, in terms of their handling, cleaning and assembly. Moreover, it is difficult to add antireflective coatings to the surface of subwavelength structures, and the transmission rates of such components therefore is not generally optimal. Thus, in the example of optical components with a silicon metasurface, the transmittance is approximately that of an air/silicon interface, that is, around 70%.

Therefore, the inventors for a time considered using an encapsulation layer in order to encapsulate the subwavelength structures and thus facilitate the use thereof while allowing for the use of an antireflective coating at the surface of the encapsulation layer. In these attempts, the result was deceptive since, even with an antireflective coating, the metasurface optical components thus encapsulated had a reduced transmittance with respect to the same metasurface optical components that had not been encapsulated.

Thus, for the development of optical systems including metasurface optical components, it is necessary to provide metasurface optical components having an improved transmittance with respect to the current metasurface optical components.

The use of a set of subwavelength structures in order to determine the refractive index of a gas, on the basis of the variation in the transmittance of these subwavelength structures, is known from document WO 2019/222070. In this document, no optical component function is sought, since there are no modifications of the geometry/arrangement of the subwavelength structures to provide a spatial phase gradient that are used to provide such an optical function. Thus, document WO 2019/222070 does not disclose a metasurface optic as such.

This document more specifically discloses a component for determining the refractive index of a gas comprising:
- a first substrate,
- a set of subwavelength structures arranged on a surface of the first substrate, the subwavelength structures forming a periodic array of resonators all having the same geometry, as indicated in paragraph [25],
- an encapsulation layer for encapsulating the set of subwavelength structures and forming a closed cavity for receiving the gas to be studied.

According to the teaching of the above-mentioned document, in such a component, the subwavelength structures are chosen with a specific arrangement and dimensioning. Indeed, to ensure a transmission response as described in their patent (FIG. 7, curve 700), these structures, or resonators, are part of a very specific arrangement concerning the overlapping of electric and magnetic resonance modes of the structures.

Indeed, in the regular arrangement of identical structures described in said document corresponding to the arrangement used for FIG. 7, it is possible to compensate for the transmission dips by superimposing the two electric and magnetic resonance modes of the structure and thus have a flat and broadband spectral transmission. Naturally, if there is a departure from the particular dimensions/arrangement of the structures, the transmission resonances reappear. This improvement in transmission disclosed by document WO 2019/222070 cannot be utilized in the context of a metasurface optic. Indeed, for such metasurface optics, the dimensioning of the structures is varied and the condition cannot be obtained for all of the structures.

It should also be noted that document WO 2019/222070 concerns near-infrared wavelengths (see, for example, FIGS. 7 and 8) for which, in accordance with the general knowledge of a person skilled in the art, the Fresnel reflection losses are particularly low given that these indices are low, and it is therefore easy to obtain a good transmission without any particular coating. Thus, in the context of document WO 2019/222070 and FIG. 7, the encapsulation layer is not the cause of stray reflections that would disturb the transmission measurements.

Thus, aside from the fact that document WO 2019/222070 does not disclose a metasurface optic as such, it does not provide any teaching that would be useful for providing optical components having improved transmittance with respect to the current metasurface optical components.

DISCLOSURE OF THE INVENTION

The invention thus aims to solve the problem mentioned above.

To this end, the invention relates to a metasurface optical component for a given wavelength range, the metasurface optical component comprising:
- a substrate,
- a set of subwavelength structures arranged on a surface of the first substrate, the subwavelength structures for forming a metasurface optic in a given wavelength range,
- the metasurface optical component also includes a layer, referred to as an encapsulation layer, that is substantially parallel to the surface of the substrate, the encapsulation layer having a thickness $E_C$ and being spaced apart from the set of structures by a space, referred to as the encapsulated space, over a distance d, wherein the thickness $E_C$ of the encapsulation layer and the first distance d are adapted so that the encapsulation layer and the encapsulated space together form a multilayer antireflective coating in the given wavelength range.

Thus, by using the encapsulated space present between the encapsulation layer and the set of structures to form, with the encapsulation layer, a multilayer antireflective coating, the metasurface optical component according to the invention has a transmittance greater than that of a classic metasurface optical component, that is, without an encapsulation layer or having an encapsulation layer that does not conform to the invention as previously envisaged by the inventors.

In addition, with such an encapsulation layer protecting the set of structures, the uses of such a metasurface optical component, such as handling, cleaning and assembly, are facilitated. Moreover, as described in association with FIG. 5, the inventors have demonstrated that, with such a configuration, the encapsulation layer does not significantly modify the phase offset introduced by the structures. The configuration of the invention is therefore directly applicable to the component of the prior art without the need to modify the arrangement of the structures at the surface of the substrate.

It must be understood, above and throughout the remainder of this document, by "encapsulation layer spaced apart from the set of subwavelength structures over a first distance d" that the encapsulation layer is spaced apart, in a direction perpendicular to the first surface of the substrate on which the set of subwavelength structures is arranged, from the top of the highest subwavelength structure by distance d.

It must be understood by subwavelength structures, in association with the given wavelength range, that each structure has lateral dimensions, that is, according to the directions included in a plane parallel to the first surface of the substrate, that are less than half of the lowest wavelength of the given wavelength range. In other words, each structure has, according to a cross-section parallel to the surface of the substrate, a maximum dimension less than half of the lowest wavelength of the given wavelength range of the metasurface optic formed by the set of structures arranged on the surface of the first substrate.

It should be noted, of course, that even if it is unconventional for a person skilled in the art to use an encapsulated space to form a multilayer antireflective coating with an encapsulation layer, according to the prevent invention, the dimensioning of such a multilayer antireflective coating remains the same as that of a classic multilayer coating. Thus, as described in the remainder of the present disclosure, the choices for the thickness $E_C$ and the first distance d for the formation of a multilayer antireflective coating in the given wavelength range can easily be made by a person skilled in the art on the basis of routine calculation and simulation.

The subwavelength structures of the set of subwavelength structures can have at least one feature, selected from a geometric dimension and a distance with respect to at least one adjacent structure, that varies along the surface of the first substrate.

According to the invention, such a variation in the geometry of the subwavelength structures (dimension and/or arrangement) makes it possible to provide a spatial phase gradient $\phi(x, y)$ in order to deflect the rays in accordance with the desired optical function (focus, deflection, etc.). It is indeed noted that in such a metasurface optic, the deflection of light rays is provided as a first approximation by the generalized Snell-Descartes law relating the output angle of the rays to the angle of index and to this spatial phase gradient obtained by a variation of the geometry (dimension and arrangement) of the structures.

The distance with respect to at least one adjacent structure may be a distance to the first neighbor, that is, the distance, such as a center-to-center distance, between the structure and the structure closest to it (that is, the "first neighbor"), or an array pitch, that is a distance, such as a center-to-center distance, with respect to an adjacent structure according to a particular direction of the set of subwavelength structures.

The geometric dimension may be a lateral dimension, that is, in the plane of the substrate, or a height, that is, perpendicular to the plane of the substrate. The plane of the substrate is defined by the surface of the first substrate.

The encapsulation layer may be made of silicon or germanium, the given wavelength range being an infrared wavelength range, the thickness $E_C$ of the encapsulation layer being between 50 and 250 nm, and the first distance d being between 0.5 and 1.5 μm.

The thickness $E_C$ of the encapsulation can be between 50 and 200 nm and the first distance d can be between 0.6 and 1.2 μm.

Each subwavelength structure can be in the form of a silicon or germanium post that, according to a cross-section parallel to the surface of the first substrate, has a maximum dimension of between 0.5 and 2.5 μm, the thickness $E_C$ of the encapsulation layer being between 50 and 200 nm and the first distance d being between 0.6 and 1.3 μm.

Each subwavelength structure can be in the form of a silicon or germanium post that, according to a cross-section parallel to the surface of the first substrate, has a maximum dimension of between 2 and 3 μm, the thickness $E_C$ of the encapsulation layer being between 50 and 250 nm and the first distance d being between 0.7 and 1.2 μm.

Each subwavelength structure can be in the form of an opening formed in a silicon or germanium layer, said opening having, according to a cross-section parallel to the surface of the first substrate, has a maximum dimension of between 0.5 and 2.5 μm, the thickness $E_C$ of the encapsulation layer being between 50 and 250 nm and the first distance d being between 0.5 and 1.2 μm.

Each subwavelength structure can be in the form of an opening formed in a silicon or germanium layer, said opening having, according to a cross-section parallel to the surface of the first substrate, has a maximum dimension of between 2 and 3 μm, the thickness $E_C$ of the encapsulation layer being between 50 and 250 nm and the first distance d being between 0.5 and 1.5 μm.

The metasurface optical component may also include a layer, referred to as a coating layer, arranged in contact with a surface of the encapsulation layer that is opposite to the set of subwavelength structures, said coating layer being involved, with the encapsulation layer and the encapsulated space, in the formation of the multilayer antireflective coating.

With such an additional coating layer, it is possible to optimize the transmittance of the metasurface optical component.

The coating layer can be made of a material chosen from zinc sulfide and zinc selenide.

The encapsulation layer may have a plurality of through-openings, each through-opening preferably being associated with a respective subwavelength structure with said through-opening aligned with the corresponding subwavelength structure.

Such through-openings make it possible to modify the effective refractive index of the encapsulation layer and thus make it possible to increase the range of encapsulation layer thicknesses that allow the antireflection function to be obtained. It is thus simpler to design a metasurface optical component according to the invention.

The encapsulation layer may have a surface structuring in the form of protuberances arranged on the surface of the encapsulation layer 130 located opposite the set of structures.

At least some of the subwavelength structures may have, in a direction perpendicular to the surface of the first substrate, a variable cross-section.

The first substrate may have, on a second surface, opposite to the set of subwavelength structures, an antireflective layer for the given wavelength range.

In this way, it is possible to particularly optimize the transmittance of the metasurface optical component according to the invention.

It should be noted that, according to a possibility of the invention, the thickness $E_C$ of the encapsulation layer and the first distance d can be chosen so as to be close to values according to the following equations:

$$\tan(\delta_1)^2 = \frac{(n_{\mathit{eff}} - n_i) \times (n_d^2 - n_i \times n_{\mathit{eff}}) \times n_{Ec}^2}{(n_{Ec}^2 n_{\mathit{eff}} - n_d^2 \times n_i) \times (n_i \times n_{\mathit{eff}} - n_{Ec}^2)}$$

$$\tan(\delta_2)^2 = \frac{(n_{\mathit{eff}} - n_i) \times (n_i \times n_{\mathit{eff}} - n_{Ec}^2) \times n_d^2}{(n_{Ec}^2 n_{\mathit{eff}} - n_d^2 \times n_i) \times (n_d^2 - n_i \times n_{\mathit{eff}})}$$

$$\delta_1 = \frac{2\pi n_{Ecs} E_C}{\lambda}$$

$$\delta_2 = \frac{2\pi n_d d}{\lambda}$$

with $n_i$, $n_{Ec}$, $n_d$ and $n_{\mathit{eff}}$ being the respective refractive indices of the incident medium through which the electromagnetic radiation is transmitted, the encapsulation layer, the encapsulated space, and subwavelength structures, the latter index being an effective index, $\delta_1$ and $\delta_2$ being the phase shifts generated respectively by the encapsulation layer and the encapsulated space and $\lambda$ being the wavelength for which the encapsulation layer/encapsulated space assembly forms the multilayer antireflective coating.

It should of course be noted that, when solving these equations, it is necessary to take into account the fact that, in a metasurface optical device, the distribution of diameters of subwavelength structures is generally non-homogeneous along the surface of the first substrate and therefore that the effective index of the subwavelength structures varies along the surface of the first substrate. Thus, in the equations above, this effective refractive index of the subwavelength structures can be a mean effective refractive index or even a median effective refractive index. The effective refractive index of the subwavelength structures retained will generally be between the two extreme values taken by the effective index of the subwavelength structures along the surface of the first substrate.

In addition, in accordance with the usual calculations when designing a multilayer antireflective coating, the thickness $E_C$ of the encapsulation layer and the first distance d determined on the basis of the equations above are respectively modulo $$\left[\frac{\lambda}{2 n_{Ecs}}\right] \text{ and } \left[\frac{\lambda}{2 n_d}\right].$$

By close values, it is understood above and throughout the remainder of this document that the thickness $E_C$ of the encapsulation layer and the first distance d can have values of between 40% and 150%, or between 20% and 130% or between 15% and 120%, of the values making it possible to satisfy the equation above.

The invention also relates to a method for manufacturing a metasurface optical component comprising the following steps:

providing a first substrate, forming a set of subwavelength structures arranged on a surface of the first substrate to form a metasurface optic in the given wavelength range, the manufacturing method being characterized in that it also includes the following step:

providing a layer, referred to as an encapsulation layer, that is substantially parallel to the surface of the first substrate, and having a thickness $E_C$, and being spaced apart from the set of structures by a space, referred to as the encapsulated space, over a distance d, in which method, when providing the encapsulation layer, the thickness $E_C$ of the encapsulation layer and the first distance d are adapted so that the encapsulation layer and the encapsulated space together form a multilayer antireflective coating in the given wavelength range.

Such a method makes it possible to provide an optical component according to the invention and to benefit from all of the advantages associated with it.

The step of providing the encapsulation layer may include the following sub-steps:

forming at least one element for supporting the encapsulation layer in contact with the surface of the first substrate, the supporting elements extending beyond the set of subwavelength structures by a height equal to the first distance d, providing the encapsulation layer, bonding the encapsulation layer in contact with the at least one supporting element.

In this way, it is possible to easily define the first distance d when forming the at least one supporting element.

The sub-step of bonding the encapsulation layer in contact with the at least one supporting element can consist of surface-activated bonding.

The sub-step of bonding the encapsulation layer in contact with the at least one supporting element can consist of atomic diffusion bonding.

The sub-step of bonding the encapsulation layer in contact with the at least one supporting element can consist of oxide-oxide direct bonding.

Such steps of direct bonding of the encapsulation layer on the at least one element make it possible to obtain a bond without the use of an intermediate resin or polymer-type bonding material.

In the step of bonding of the encapsulation layer in contact with the at least one supporting element, the encapsulation layer and the at least one supporting element may have a temperature differential, the temperature differential prefer-ably being between 10° C. and 150° C., or between 20 and 100° C.

Such a temperature differential during the bonding sub-step makes it possible to ensure good planarity of the encapsulation layer.

The step of forming the at least one supporting element may include:

formation of a respective extension of the or each sup-porting element on the surface of the first substrate, said extension(s) extending over a height equal to the first distance d, localized etching of the surface of the first substrate to form the rest of the or each supporting element and the subwavelength structures of the set of subwavelength structures.

In this way, it is possible to form the subwavelength structures and the at least one supporting element together. The number of manufacturing steps is thus optimized.

In the step of providing the first substrate, a substrate including the first substrate, an insulating layer arranged in contact with the first substrate, and a semiconductor layer in contact with the insulating layer may be provided, the sum of the thickness of the insulating layer and the thickness of the semiconductor layer being equal to the first distance d, the formation of a respective extension of the or each supporting element including a localized etching of the semiconductor layer and the insulating layer.

It should be understood here and in the remainder of this document, by insulating layer, that said layer is made of an electrically insulating material, that is, having a relative permittivity greater than 1.

BRIEF DESCRIPTION OF THE DRAWINGS

The present invention will be better understood on read-ing the description of examples of embodiments, provided purely for information and which are in no way limiting, with reference to the appended drawings, wherein.

Identical, similar or equivalent parts of the different figures have the same numeric references so as to facilitate reading from one figure to another.

The different parts shown in the figures are not necessarily shown according to a uniform scale, in order to make the figures easier to read.

The different possibilities (alternatives and embodiments) must be understood as not being mutually exclusive and as being capable of being combined with one another.

It should be noted that, for the purpose of simplification, the subwavelength structures are sometimes simply referred to as "structures", in particular in relation to the metasurface optic or the metasurface device.

DESCRIPTION OF EMBODIMENTS

Figure 1:
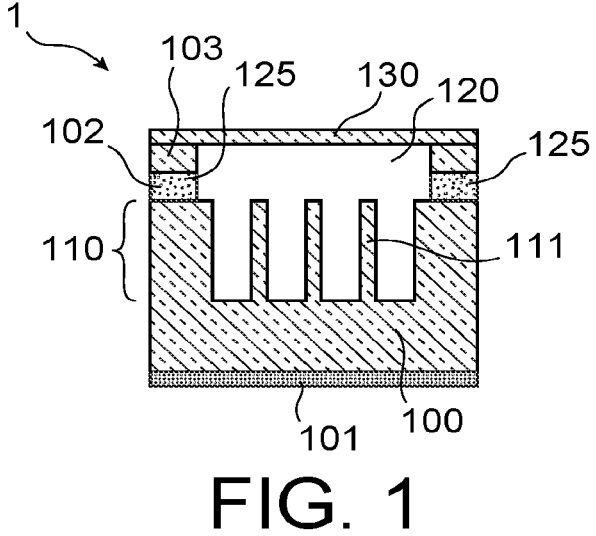
FIG. 1 shows a component according to a first embodi-ment of the invention.

FIG. 1 shows a metasurface optical component 1 accord-ing to the invention, such a metasurface optical component 1 comprising a set of structures 111 arranged at the surface of a first substrate 100 of the metasurface optical component 1 in order to form a metasurface optic, said metasurface optical component also comprising, according to the prin-ciple of the invention, a so-called encapsulation layer, arranged at a first distance from the metasurface assembly.

Such a metasurface optical component 1 more specifically concerns optical systems for the infrared wavelength range and in particular in the far infrared range. Thus, the different values indicated in the embodiments described below con-cern a practical application, in which the targeted wave-length range is the far infrared, that is, between 3 and 20 μm. More specifically, in the present embodiments, the given wavelength range is a range of wavelengths from 7 to 14 μm.

Of course, a person skilled in the art is perfectly capable, in view of the present disclosure and on the basis of routine simulations, to adapt these values in order to provide an optimized metasurface optical component according to the principle of the invention for a wavelength range other than the infrared range.

A metasurface optical component 1 according to the invention comprises:

the first substrate 100, the set of subwavelength structures 111 arranged on a first surface of the first substrate 100, in order to form a metasurface optic in the given wavelength range, a layer, referred to as an encapsulation layer, the encapsulation layer having a thickness $E_C$ and being spaced apart from the set of structures by a space, referred to as the encapsulated space, over a first distance d.

In the present embodiment, in which the given wavelength range is between 7 and 14 $\mu$m, the first substrate is made of silicon Si or germanium Ge. To provide a relatively thin component, the first substrate may have a thickness below 100 $\mu$m. Thus, for example, the first substrate may have a thickness of 50 $\mu$m in the case of a first silicon Si substrate.

As shown in FIG. 1, in the present embodiment, the first substrate can have, on a second surface, that opposite to the set of subwavelength structures 111, an antireflective layer for the given wavelength range. Such an antireflective layer 101 may be, in accordance with the routine practice of a person skilled in the art, a zinc sulfide ZnS layer or an antireflective layer having a moth-eye structure.

The set of subwavelength structures 111 is arranged on the first surface of the first substrate 100 with, in accordance with this first embodiment, a periodic arrangement of subwavelength structures. Indeed, in the present embodiment, the phase variation generated by the structures is obtained by a variation in the lateral size of the subwavelength structures. Of course, alternatively and in accordance with the knowledge of a person skilled in the art, it may also be envisaged to obtain a variation in the phase shift by modifying the pitch between the subwavelength structures or by modifying the shapes of same.

The subwavelength structures 111 may have various shapes, which may, for example, include a solid axisymmetric cylindrical shape, a hollow cylindrical shape, a rectangular parallelepiped shape, a cross-shaped cross-section or a hexagonal cross-section. These same subwavelength structures may, according to another possibility of the invention, take the form of a hole, an opening, formed in a layer, the hole being capable of having a circular, square, hexagonal or cross-shaped lateral cross-section.

Figure 2A:
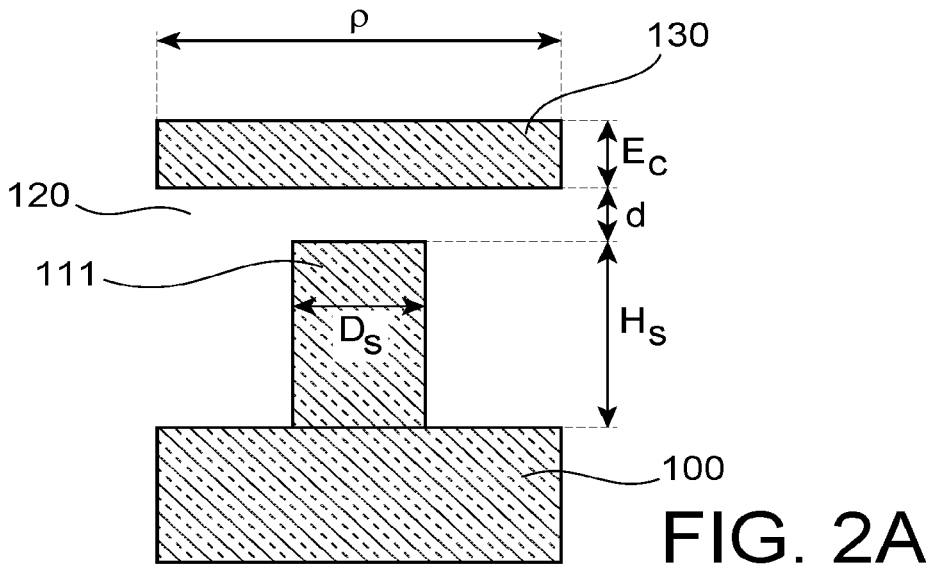
FIGS. 2A and 2B respectively show, in a schematic close-up cross-section view, a structure of the metasurface optic having, for FIG. 2A, an axisymmetric cylindrical shape and, for FIG. 2B, a cylindrical opening shape.
Figure 2B:
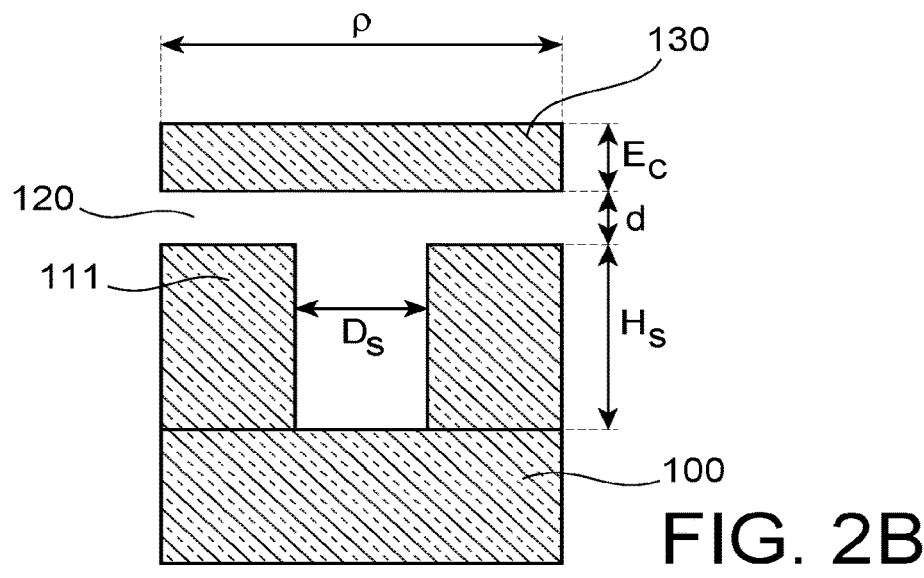

In the present embodiment, only two shapes of subwavelength structures 111 shown in FIGS. 2A and 2B are envisaged, the subwavelength structures 111 having an axisymmetric cylindrical shape and the subwavelength structures 111 formed by lateral circular cross-section openings formed in a layer. FIG. 1 thus shows the first solution concerning the subwavelength structures.

In accordance with the knowledge of a person skilled in the art, such subwavelength structures 111, in order to allow the application of a phase shift ranging from 0 to $2\pi$ with a reduced size variation, must preferably be produced so as to present, at their interface, a significant refractive index variation. In the context of this first embodiment in which the given wavelength range is between 7 and 14 $\mu$m, the subwavelength structures may be made of silicon, that is, with a refractive index of approximately 3.4 in the infrared, or germanium, that is, with a refractive index of approximately 4 in the infrared, the interface being produced with air or a primary or secondary vacuum that has a refractive index of approximately 1.

It should be noted that, in the present embodiment, and as shown in FIGS. 2A and 2B, the subwavelength structures 111 have the same height Hs and a variable lateral dimension Ds so as to provide the phase-shift variation, as already specified, the pitch P being constant. According to two particular examples of this first embodiment, the subwavelength structures 111 may have:

either a solid axisymmetric cylindrical shape, the lateral dimension being the diameter of said cylinder, or a cylindrical opening shape formed in a layer arranged at the surface of the first substrate, the lateral dimension being the diameter of said opening.

The encapsulation layer 130 is arranged parallel to the first surface of the first substrate 100, being spaced apart from the set of structures by a space 120, referred to as the encapsulated space, over a first distance d.

Such an arrangement of the encapsulation layer 130 spaced apart from the set of subwavelength structures 111, is obtained, in the context of this first embodiment, by means of a lateral encapsulation wall 125, surrounding the set of subwavelength structures 111. This lateral encapsulation wall 125 may be continuous, so that the encapsulated space is hermetic, or discontinuous, the encapsulated space then being in communication with the exterior.

The lateral wall 125 may include, as shown in FIG. 1:

a first portion extending from the first surface of the first substrate 100 in a direction perpendicular to the surface of the first substrate 100 and over the same height as the subwavelength structures, an extension including an insulating layer portion 102 (the insulating character being optional) and a semiconductor layer portion 103 with the sum of thicknesses of said insulating layer and said semiconductor layer being equal to the first distance d.

In the context of this first embodiment, the first portion and the semiconductor layer portion 103 are both made of silicon Si, while the insulating layer 102 is made of silicon dioxide $SiO_2$.

Of course, as will be further specified below, the configuration of the lateral wall described above is merely an example of an embodiment in accordance with this first embodiment, and other configurations are perfectly conceivable without going beyond the scope of the invention. It should be noted in particular, for example, and without going beyond the scope of the invention, that:

the insulating layer portion 102 may be made of a different material, such as silicon nitride $Si_3N_4$ or alumina $Al_2O_3$, the semiconductor layer portion 103 may be made of germanium or of a non-semiconductor material, such as a metal.

In the same way, it may also be envisaged that the lateral wall does not have an insulating layer portion 102, the lateral wall being capable of being, for example, made entirely of silicon Si.

The lateral wall 125 forms a supporting element 125, the supporting element 125 extending beyond the set of subwavelength structures by a height equal to the first distance d.

Of course, the lateral wall 125 described above is an example of an embodiment of a supporting element according to the invention. Other types of supporting elements, such as pillars and/or lateral reinforcements can be used in addition and/or as an alternative to the lateral wall 125 without going beyond the scope of the invention.

The encapsulated space 120 is, in the present embodiment, filled with air. Of course, as an alternative, this space may have a depression, such as a primary or secondary vacuum or an ultra-high vacuum, without going beyond the scope of the invention.

The first encapsulation layer is, in the context of this first embodiment, made of silicon Si. Of course, other materials can be envisaged without going beyond the scope of the invention. In particular, germanium Ge is cited as a possibility and is described in detail below.

The encapsulation layer 130 has a thickness $E_C$. According to the principle of the invention, the thickness $E_C$ of the encapsulation layer and the first distance d are adapted so that the encapsulation layer 130 and the encapsulated space 120 participate together in the formation of a multilayer antireflective coating in the given wavelength range that, in the context of this first embodiment, is a bilayer antireflective coating formed by the encapsulation layer 130 and the first encapsulated space.

To illustrate the approach of the inventors, and according to a first approximation in which the set of subwavelength structures is considered to be a homogeneous silicon Si surface, in order to obtain such an antireflection function, the encapsulation layer 130 and the encapsulated space 120 must generate a respective phase shift $\delta_1$ and $\delta_2$ that respectively satisfies:

$$\tan^2 \delta_1 = \frac{(n_1 - n_{Air})(n_{Air}^2 - n_{Air} \cdot n_1) \cdot n_1^2}{(n_1^3 - n_{Air}^3) \cdot (n_{Air} \cdot n_1 - n_1^2)} = 0.2126$$

$$\tan^2 \delta_2 = \frac{(n_1 - n_{Air}) \cdot (n_{Air} \cdot n_1 - n_1^2) \cdot n_{Air}^2}{(n_1^3 - n_{Air}^3) \cdot (n_{Air}^2 - n_{Air} \cdot n_1)} = 0.2126$$

with n1 and $n_{Air}$ being the refractive indices, respectively, of the material of the encapsulation layer 130 and the set of subwavelength structures 111, that is, silicon Si, in the given wavelength range, and that of the encapsulated space and the medium in which the electromagnetic radiation is received, that is, air.

In other words, the phase shifts $\delta_1$ and $\delta_2$ must respectively satisfy:

$$\delta_1 \equiv 0.4321[\pi]$$

$$\delta_2 \equiv 0.4321[\pi]$$

However, the phase shifts $\delta_1$ and $\delta_2$ generated by the encapsulation layer 130 and by the encapsulated space 120 are respectively equal to:

$$\delta_1 = \frac{2\pi n_1 E_C}{\lambda}$$

$$\delta_2 = \frac{2\pi n_{Air} d}{\lambda}$$

with $\lambda$ being the wavelength for which the encapsulation layer/encapsulation space assembly forms the multilayer antireflective coating.

Thus, if the wavelength $\lambda$ is 10.6 µm, that is, substantially the middle of the given wavelength range, the following thickness values $E_C$ are obtained for the encapsulation layer and the first distance:

$$E_C \equiv 213 \text{ nm} \left[ \frac{\lambda}{2n_1} \right]$$

$$d \equiv 729 \text{ nm} \left[ \frac{\lambda}{2n_{Air}} \right]$$

Nevertheless, and as noted by the inventors, such values are not always suitable within the context of the invention. It is indeed necessary to take into account the influence of the subwavelength structures 111 in order to adapt the values determined above.

By considering the influence of the subwavelength structures 111, the inventors determined, in the context of the invention, and for an encapsulation layer 130 made of silicon Si, that it was possible to obtain an antireflection function for an encapsulation layer thickness $E_C$ of between 50 and 250 nm and for a first distance d of between 500 nm and 1.5 µm.

It should be noted that in the simulation results described below, the simulated optical components have subwavelength structure diameters over the entire diameter range $D_s$ presented with a homogeneous distribution of its diameters over the entire surface of the first substrate, in order to provide a representative hypothetical optic.

Figure 3A:
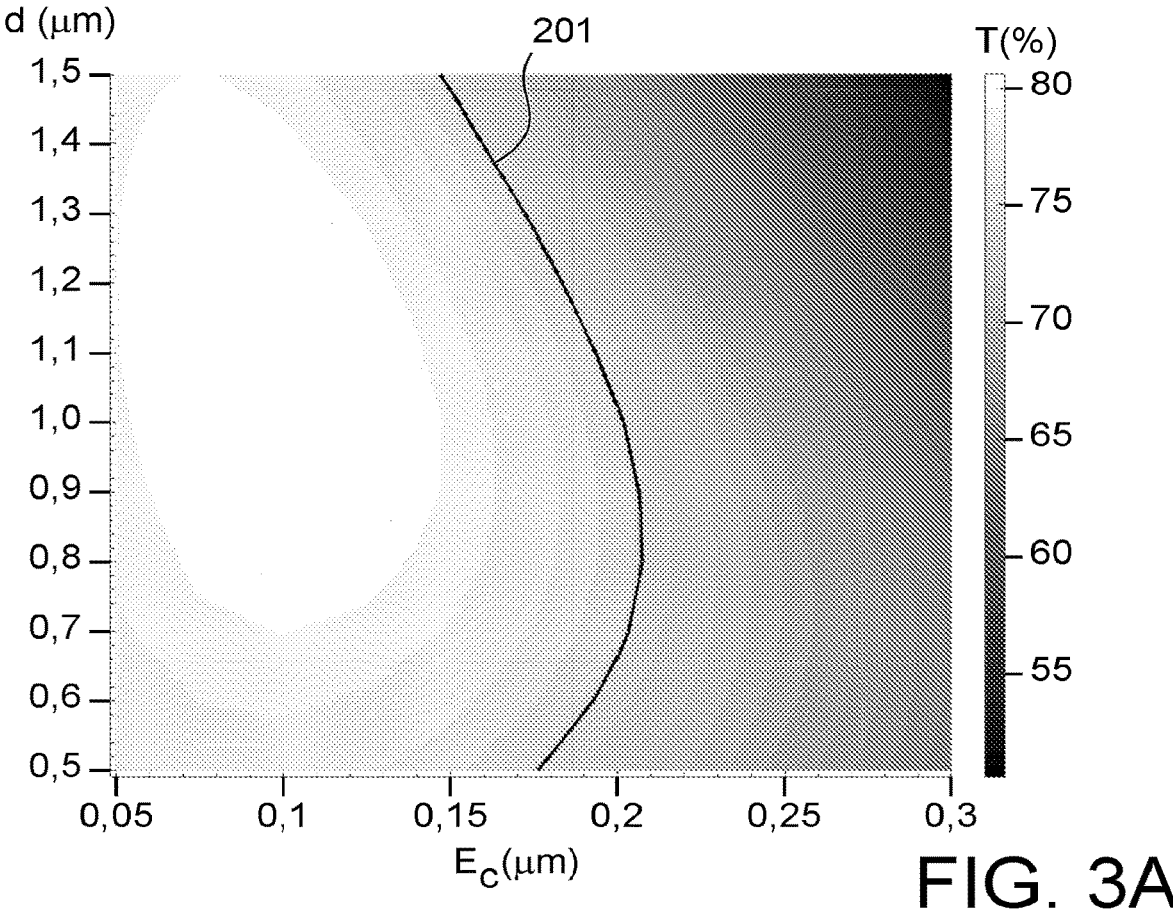
FIGS. 3A and 3B show the variation in transmittance as a function of the thickness of an encapsulation layer and the first distanced between the encapsulation layer and the subwavelength structures of a metasurface optic, for a component according to the invention including subwave-length structures of the metasurface optic having a respec-tive diameter of between 0.5 and 2.5 μm for FIG. 3A, and between 2 and 3 μm for FIG. 3B, FIGS. 4A and 4B show the variation in transmittance as a function of the thickness of an encapsulation layer and the first distanced between the encapsulation layer and the subwavelength structures of a metasurface optic, for a component according to the invention including subwave-length structures of the metasurface optic having a cylindri-cal opening shape with a respective diameter of between 0.5 and 2.5 μm for FIG. 4A, and between 0.5 and 1.5 μm for FIG. 4B.
Figure 3B:
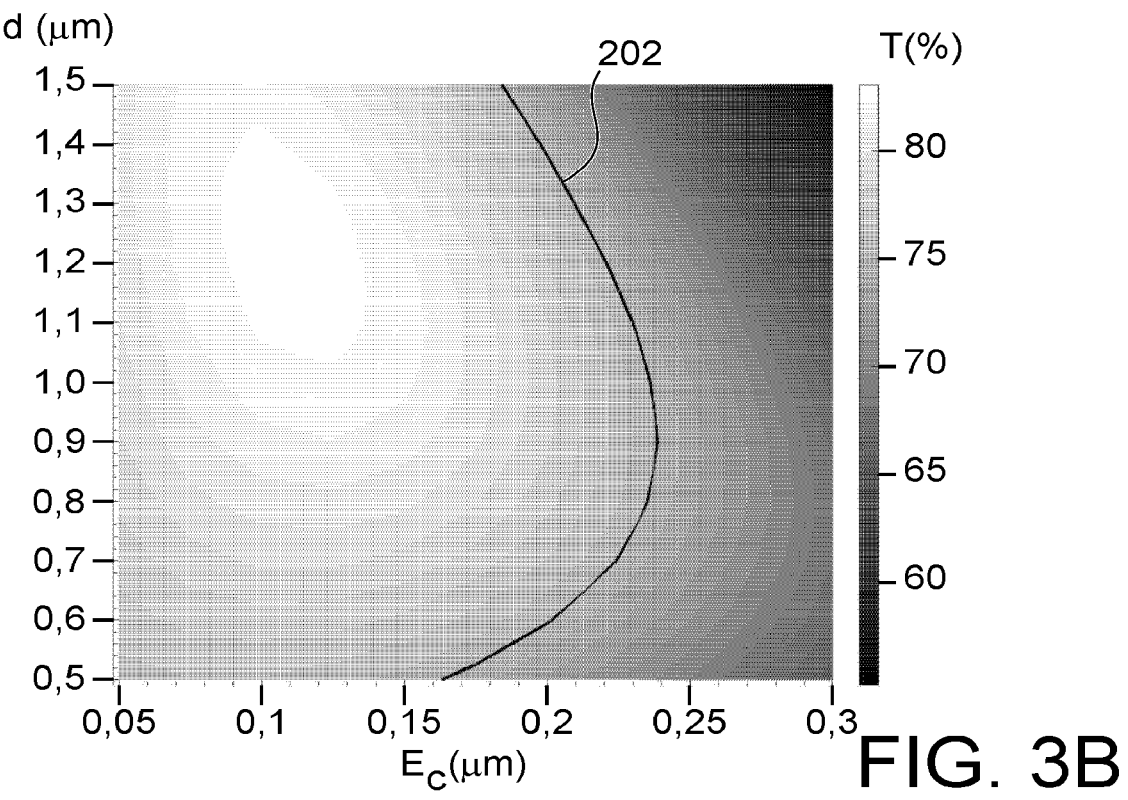

To illustrate this, FIGS. 3A and 3B show the mean variation in transmittance at 10.6 µm calculated by the inventors according to the thickness $E_C$ of the encapsulation layer 130 and the first distance d for a metasurface optical component 1 according to the first embodiment having cylindrical silicon Si subwavelength structures 111 with a height $H_S$ of 10 µm and a pitch P between the subwavelength structures of 3.5 µm, with, for FIG. 3A, a diameter $D_S$ of between 0.5 and 2.5 µm and for FIG. 3B, a diameter $D_S$ of between 2 and 3 µm. In FIGS. 3A and 3B the transmittance value of the same optical component without an encapsulation layer according to prior art is indicated by curves 201, 202.

It can be seen in FIGS. 3A and 3B that the transmittance of the encapsulated metasurface optical component 1 is improved with respect to an unencapsulated metasurface optical component for both subwavelength structures 111 having a small diameter $D_S$ (between 0 and 2.5 µm, corresponding to FIG. 3A) and subwavelength structures 111 having a large diameter $D_S$ (between 2 and 2.5 µm, corresponding to FIG. 3B), these two diameter ranges each making it possible to cover a phase shift ranging from 0 to $2\pi$ so as to correspond to a use of a metasurface optical component, for relatively low encapsulation layer thicknesses $E_C$, typically below 200 nm. This improvement is observed over the entire range of values for the first distance d evaluated. It can thus be confirmed, on the basis of these calculations, that the antireflective effect provided by the encapsulation layer 130 and the encapsulated space is observed for a thickness $E_C$ ranging from 50 nm to 250 nm and a first distance d ranging from 0.6 to 1.4 µm, according to the size of the subwavelength structures.

Figure 4A:
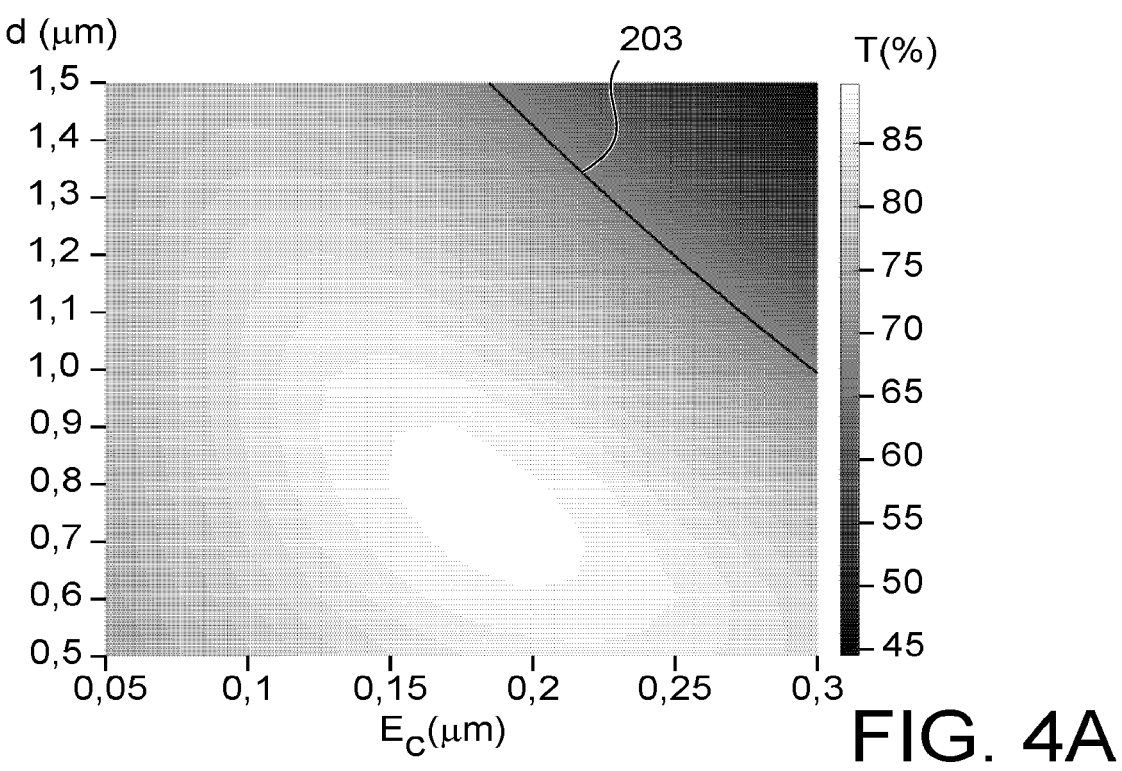
Figure 4B:
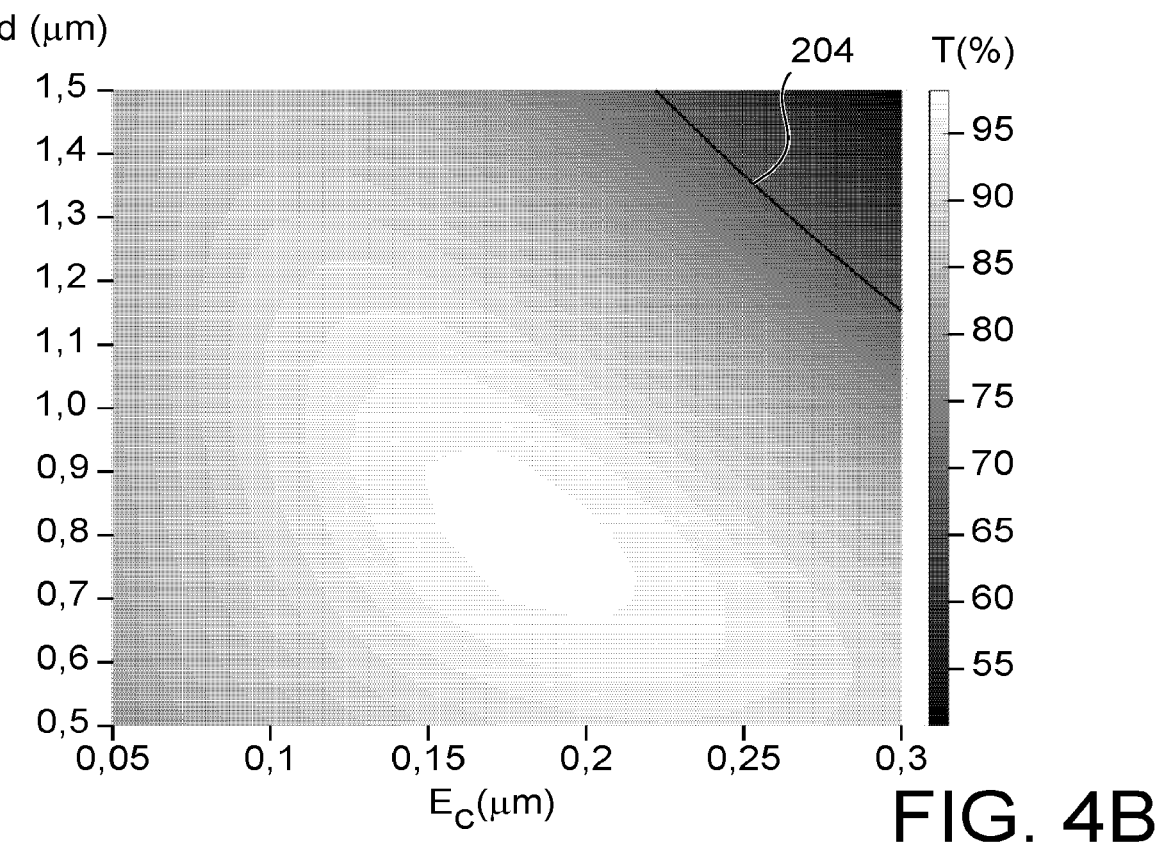

Similarly, FIGS. 4A and 4B show the variation in transmittance calculated by the inventors according to the thickness $E_C$ of the encapsulation layer 130 and the first distance d for a metasurface optical component 1 according to the first embodiment. This metasurface optical component 1 has, for FIG. 4A, subwavelength structures 111 in the form of a cylindrical opening in a silicon Si layer, having a height H$_S$ of 10 μm and a pitch P between the subwavelength structures of 3.5 μm. The diameter D$_S$ of these subwavelength structures is between 0.5 and 3 μm. In the case of FIG. 4B, the subwavelength structures 111 generally also have a cylindrical opening shape in a silicon Si layer. The height H$_S$ of the silicon layer is 15 μm and the pitch P between the subwavelength structures is 2 μm, the diameter D$_S$ of the subwavelength structures being between 0.5 and 1.5 μm. In addition, in FIGS. 4A and 4B, the transmittance value of the same optical component without an encapsulation layer according to the prior art is indicated by the continuous lines 203, 204.

It can thus be seen in FIGS. 4A and 4B that the transmittance of the encapsulated metasurface optical component 1 is improved with respect to an unencapsulated metasurface optical component for both subwavelength structures 111 according to the simulated optical device in the context of FIG. 4A (with diameter D$_S$ between 0.5 and 3 μm) and subwavelength structures 111 according to the simulated component of the prior art without modifying the arrangement and dimensioning of the subwavelength structures of the set 111.

To demonstrate that the values identified are compatible with different configurations of the metasurface optic, the inventors calculated, for various subwavelength structure configurations, the optimal values for thickness E$_C$ of the encapsulation layer and the first distance d. The results are presented in the table below, which compares the transmittance calculated for a component without an encapsulation layer (transmittance T1) and that for the same optical component including an encapsulation layer according to the invention (transmittance T2). The values indicated in the present table are P, the pitch between two structures, Hs, the height of the structures, Ds, the range of values for the diameter of the structures, Δϕ, the maximum phase shift allowed by the range of values for the diameter of the structures, E$_C$, the thickness of the encapsulation layer, d, the distance between the encapsulation layer 130 and the set of structures, T1, the transmittance without an encapsulation layer and T2, the transmittance without an encapsulation layer.

| Structures | P | Hs | Ds | Δϕ | E$_C$ | d | T1 | T2 |
|---|---|---|---|---|---|---|---|---|
| Vacuum | — | — | — | 0 | 0.225 μm | 0.7 μm | 69.6% | 99.3% |
| Circular posts | 3.5 μm | 10 μm | [0.5 μm; 2.5 μm] | 2π | 0.1 μm | 1.1 μm | 74.8% | 80.5% |
| Circular posts | 3.5 μm | 10 μm | [2 μm; 3 μm] | 2π | 0.11 μm | 1.2 μm | 73% | 83.1% |
| Circular posts | 2 μm | 15 μm | [0.4 μm; 1.6 μm] | 2π | 0.075 μm | 1 μm | 77.2% | 81% |
| Circular posts | 1 μm | 20 μm | [0.2 μm; 0.8 μm] | 2π | 0.075 μm | 1 μm | 75.9% | 79.2% |
| Circular holes | 3.5 μm | 10 μm | [0.5 μm; 3 μm] | 2π | 0.175 μm | 0.8 μm | 68.2% | 89.7% |
| Circular holes | 2 μm | 15 μm | [0.5 μm; 1.5 μm] | 2π | 0.175 μm | 0.8 μm | 74.8% | 98.3% |
| Circular holes | 1 μm | 20 μm | [0.3 μm; 0.6 μm] | 2π | 0.175 μm | 0.8 μm | 74.6% | 98.4% |
| Maltese cross posts | 2 μm | 15 μm | [0.3 μm; 1.7 μm] | 2π | 0.075 μm | 1.2 μm | 76.4% | 80.3% |
| Maltese cross posts | 2 μm | 30 μm | [0.4 μm; 1.6 μm] | 2π | 0.05 μm | 1.3 μm | 75.4% | 77.3% | optical device in the context of FIG. 4A (with diameter D$_S$ between 0.5 and 1.5 μm) for a thickness E$_C$ of the encapsulation layer 130 of between 50 nm and 250 nm.

Figure 5:
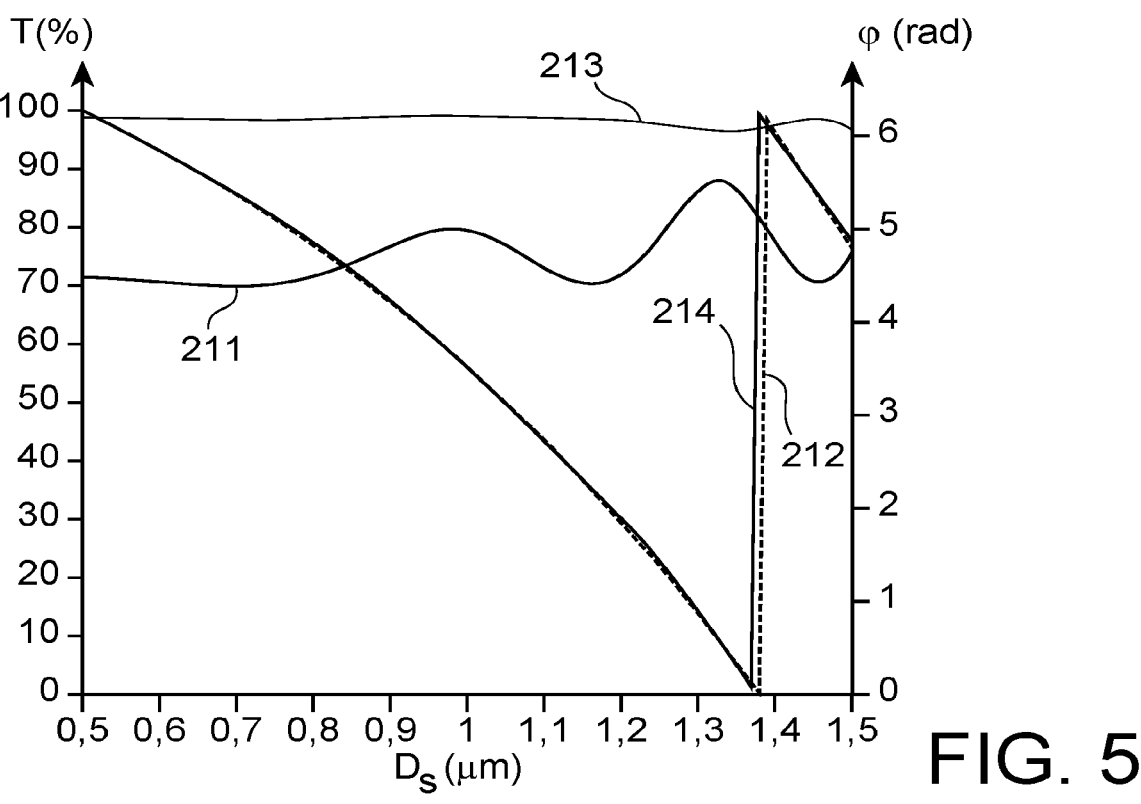
FIG. 5 shows the transmittance and the phase shift induced as a function of the size of the structures of the metasurface optic, the structures of the metasurface optic having an axisymmetric cylindrical opening shape, for both an optical component according to the prior art and an optical component according to the invention.

To illustrate the improvement provided by the use of an encapsulation layer with values for thickness of the encapsulation layer 130 and the first distance d in these ranges, the inventors showed, in FIG. 5, the variations in transmittance 213 and phase 214 calculated for a metasurface optical component 1 according to the diameter of subwavelength structures 111 in the form of openings formed in a silicon layer having a thickness of 15 μm, for an encapsulated layer thickness E$_C$ of 175 nm and a first distance d of 800 nm. These variations are compared with the variations in transmittance 211 and phase 212 obtained for an unencapsulated metasurface optical component of the prior art having a similar configuration.

It can be seen that the transmittance is, with a metasurface optical component according to this first embodiment, greater than 96% while it varies between 70 and 88% for the metasurface optical component of the prior art. This improvement in transmittance is associated with a preserved phase variation, showing that the metasurface properties are perfectly preserved in the context of implementation of the invention. It is thus possible to adapt a metasurface optical On the basis of the same type of calculations, the inventors identified that, for the given wavelength range of the present embodiment and for a germanium encapsulation layer 130, the encapsulation layer/encapsulated space assembly forms a multilayer antireflective coating for a range of thicknesses E$_C$ of the encapsulation layer 130 of between 50 and 250 nm and for a first distance d of between 0.5 and 1.5 μm.

It should be noted that the inventors also provided, in the disclosure of the invention, a formal approach concerning the criteria for obtaining the multilayer antireflective coating according to the invention in a bilayer configuration including the encapsulation layer and the encapsulated space. This approach uses the concept of effective refractive index of the subwavelength structures, which can in particular be determined from simulations.

Figure 6A:
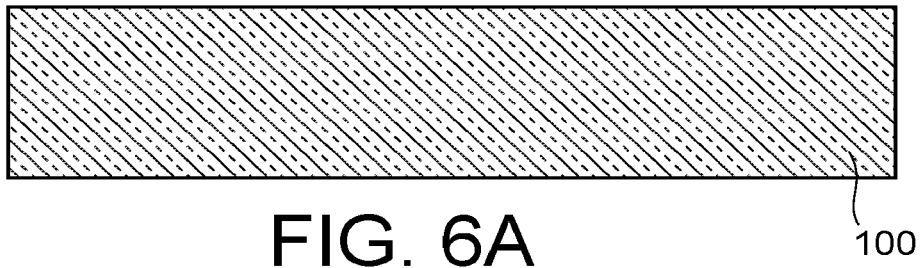
FIGS. 6A to 6K show, in a lateral cross-section view, the steps of collective manufacturing of optical components according to the first embodiment, with, in FIGS. 6J and 6K a cross-section view and a top view of said components before separation, FIGS. 7A and 7B respectively show, in a schematic close-up cross-section view, a structure of the metasurface optic according to a second embodiment wherein the encap-sulation layer has, for each structure, an associated opening, the subwavelength structures of the metasurface optic hav-ing, for FIG. 7A, an axisymmetric cylindrical shape and, for FIG. 7B, a cylindrical opening shape, FIGS. 8A and 8B respectively show, in a schematic close-up cross-section view, a structure of the metasurface optic according to a third embodiment wherein the encap-sulation layer has an additional coating, the subwavelength structures of the metasurface optic having, for FIG. 8A, an axisymmetric cylindrical shape and, for FIG. 8B, a cylin-drical opening shape, FIGS. 9A and 9B graphically show the first distance d and the thickness of the additional coating layer calculated as a function of the thickness of the encapsulation layer for subwavelength structures having an axisymmetric cylindri-cal opening shape made of a silicon layer, respectively for an encapsulation layer thickness of between 600 and 1800 nm and between 0 and 200 nm, FIGS. 10A and 10B respectively show, in a schematic close-up cross-section view, a structure of the metasurface optic according to a fourth embodiment wherein the sub-wavelength structures of the metasurface optic have a two-stage configuration, each state of the subwavelength struc-ture having, for FIG. 10A, an axisymmetric cylindrical shape and, for FIG. 10B, a cylindrical opening shape.
Figure 6B:
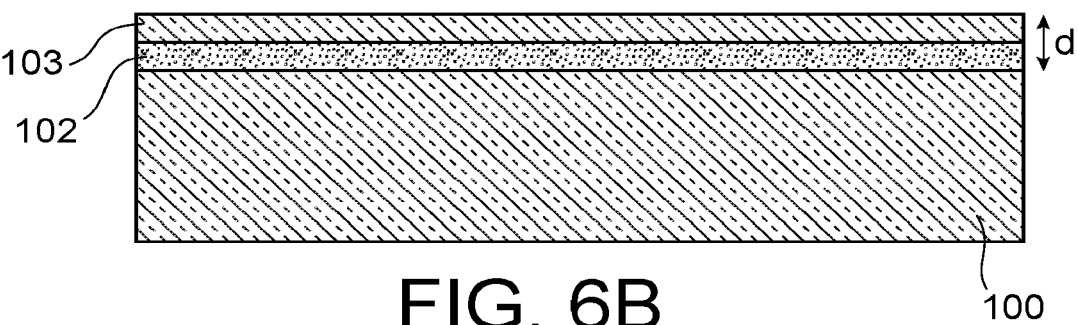
Figure 6C:
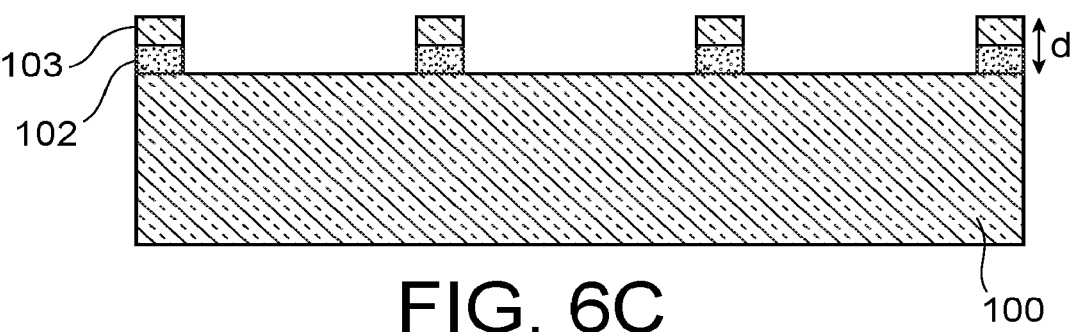
Figure 6D:
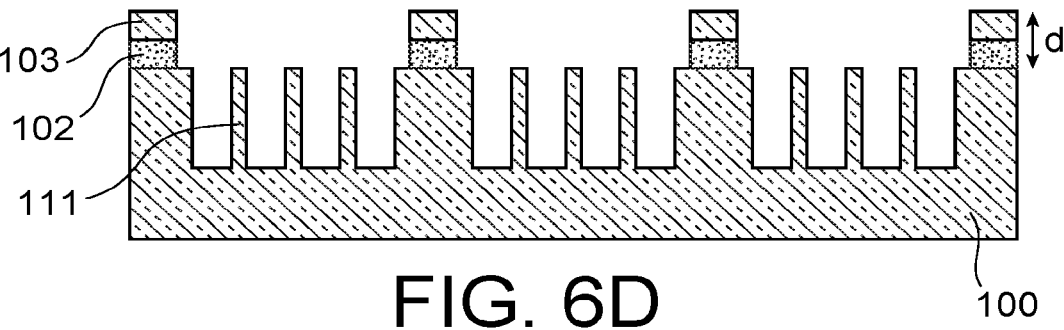
Figure 6E:
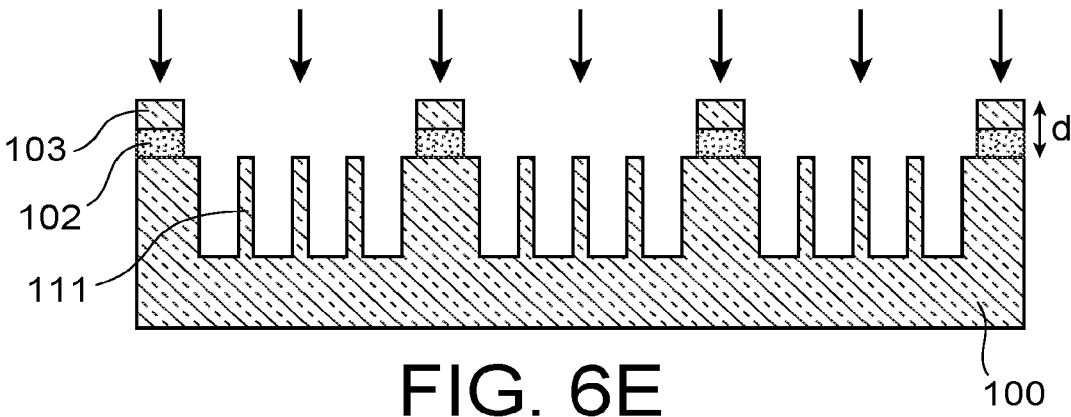
Figure 6F:
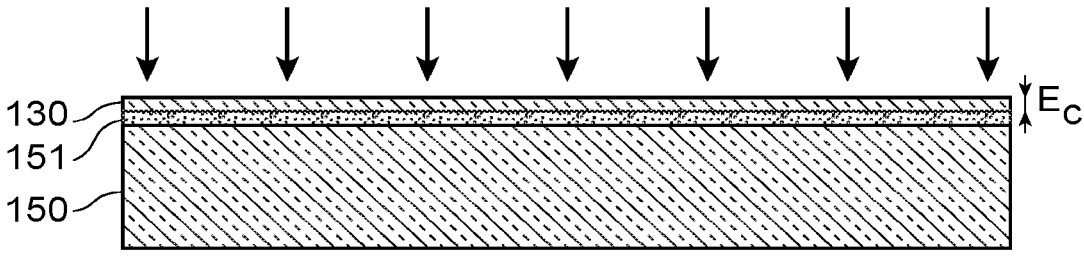
Figure 6G:
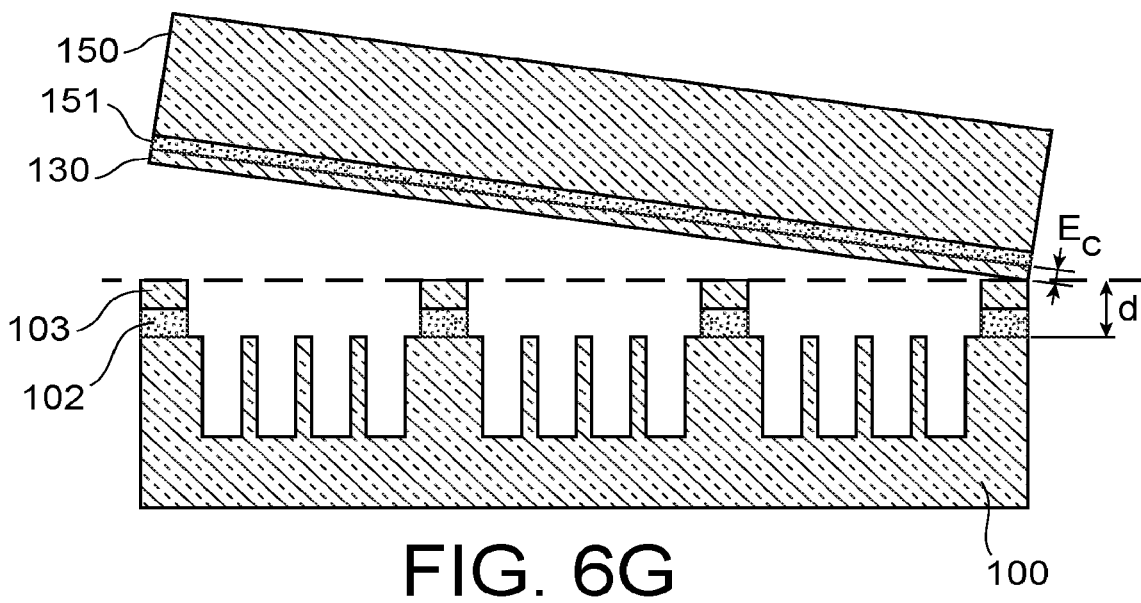
Figure 6H:
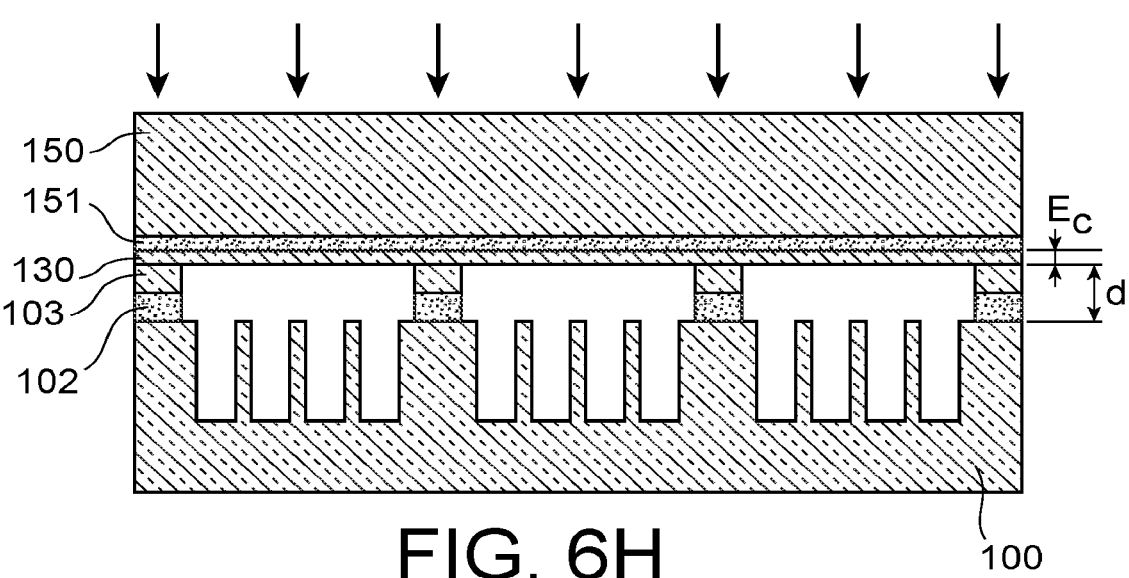
Figure 6I:
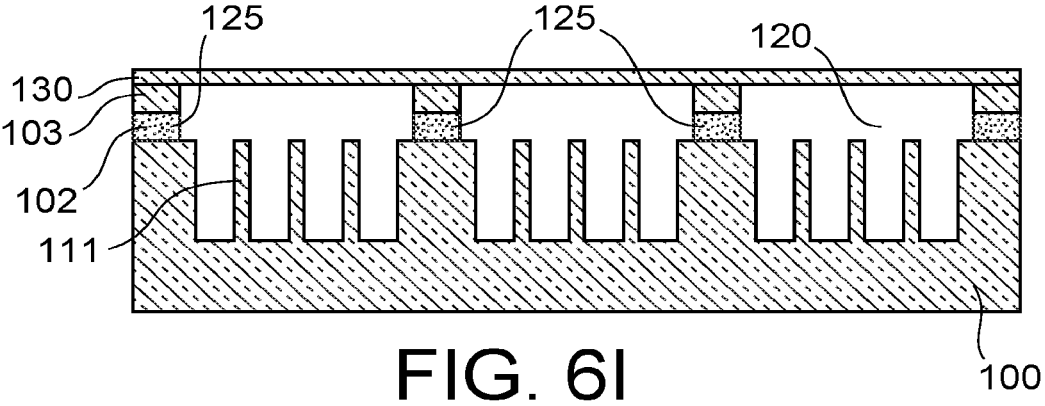
Figure 6J:
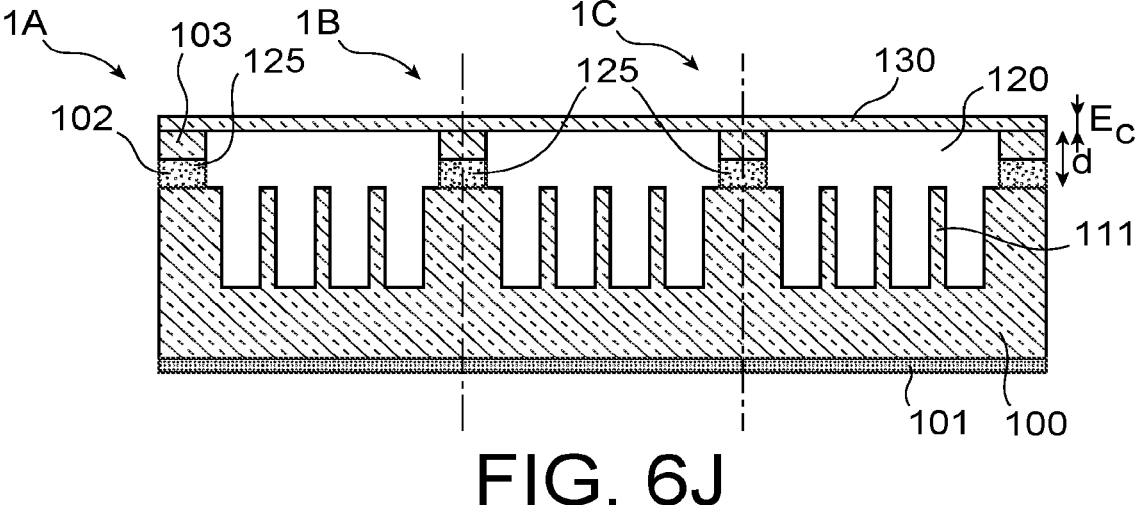
Figure 6K:
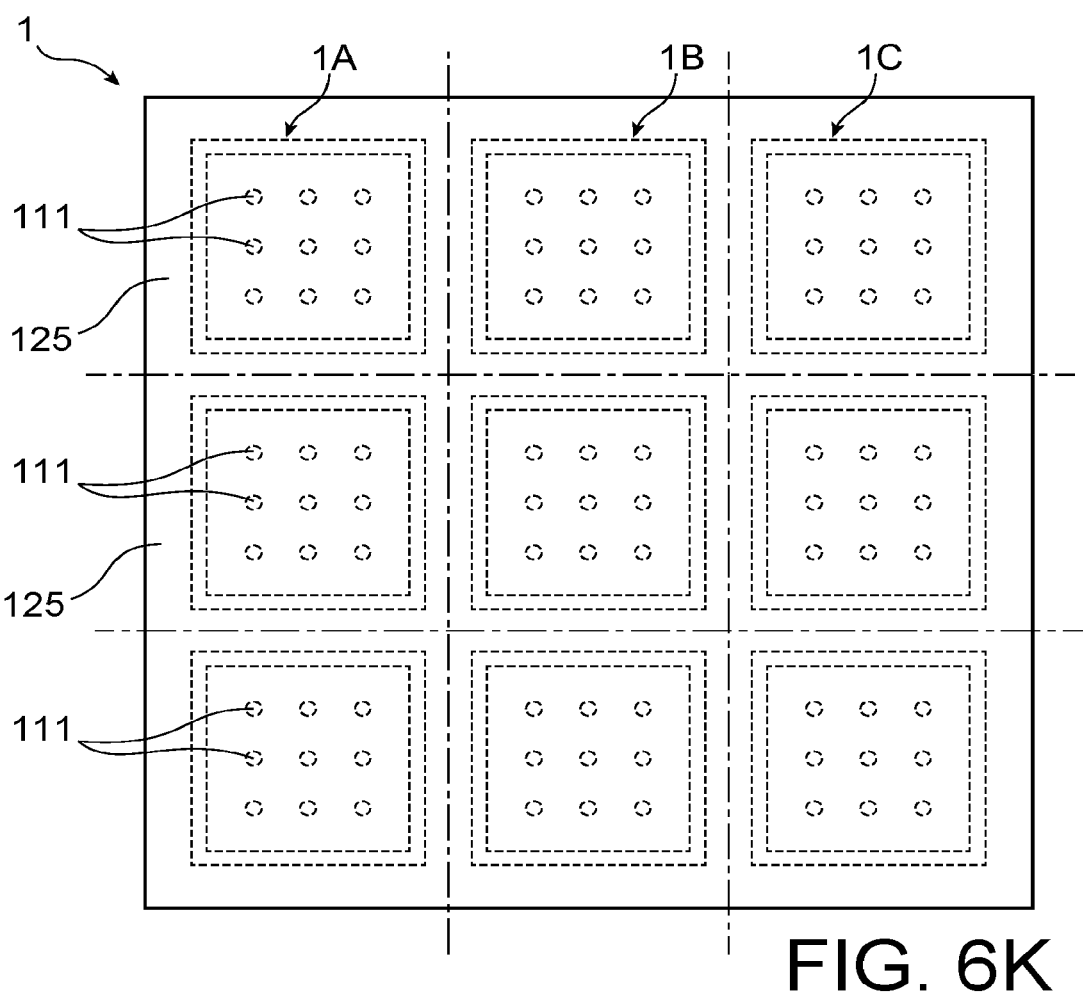

FIGS. 6A to 6K show the main steps of collective manufacturing of a metasurface optical component according to the invention, the optical components before separation, presented with dashed lines, being shown in the cross-section view of FIG. 6J and the top view of FIG. 6K.

Such a collective manufacturing method may include the following steps:

providing the first silicon Si substrate 100 as shown in FIG. 6A, oxidizing the first substrate 100 to form the silicon dioxide SiO₂ insulating layer 102, depositing a first semiconductor layer 103 made of amorphous silicon a-Si in contact with the insulating layer, the sum of the thickness of the insulating layer and the semiconductor layer being equal to the first distance d, as shown in FIG. 6B, localized etching of the first semiconductor layer 103 and the insulating layer 102 so as to form the first extensions of the different lateral walls 125, as shown in FIG. 6C, FIG. 6K illustrating the arrangement of said lateral walls 125, localized etching of the surface of the first substrate 100 to form the rest of the lateral walls 125 and the subwavelength structures 111, so that the subwavelength structures 111 thus formed are formed on the surface of the first substrate 100 thus etched, as shown in FIG. 6D, ion activation of the surface of the lateral walls 125 opposite the first substrate 100 as shown in FIG. 6E, provision of a sacrificial substrate 150 having a second insulating layer 151 and a second semiconductor layer, better known by the acronym SOI, the second semiconductor layer being made of silicon and being intended to form the encapsulation layer 130, optional thinning, for example, by mechanochemical polishing, of the second semiconductor layer so that the latter forms the thickness $E_C$ of the encapsulation layer, the encapsulation layer 130 thus being formed, ion activation of the encapsulation layer 130, as shown in FIG. 6F, bonding by direct silicon/silicon bonding of the encapsulation layer 130 in contact with the lateral wall 125 under an ultra-high vacuum in order to provide surface-activated bonding, as shown in FIGS. 6G and 6H, removal of the sacrificial substrate 150 and the second insulating layer 151 in order to clear the encapsulation layer 130 130, as shown in FIG. 6I, deposition of the antireflective layer 101 onto the second surface of the first substrate, as shown in FIGS. 6J and 6K.

To optimize the steps of bonding the encapsulation layer 130 in contact with the lateral wall 125, the steps of ion activation of the surfaces of the lateral wall 125 and of the encapsulation layer 130 can be carried out by bombarding these surfaces with argon ions with an energy of between 100 and 1000 eV, preferably between 150 eV and 500 eV, or equal to 200 eV, with an intensity of between 0.1 and 1 A, preferably approximately 250 mA for a duration of between 10 and 300 s, preferably between 30 and 120 s, or approximately 60 s. The bonding step can then be carried out by positioning the first substrate 100 and the encapsulation layer one facing the other and placing them in contact one on the other, maintaining a pressure of between 0.05 and 1.6 MPa, preferably 1 MPa in an ultra-high vacuum chamber, that is, with a pressure below $10^{-7}$ mbar.

For additional information on the above-mentioned surface-activated bonding, reference is made to the work of H. Takagi and his coauthors published in the scientific journal "Applied Physics Letters", volume 68, page 2222, February 1996.

It should be noted that, alternatively, it may also be envisaged, without going beyond the scope of the invention, that the bonding of the second semiconductor layer intended for the formation of the encapsulation layer 130 on the lateral walls 125 can be carried out by atomic diffusion bonding. According to this alternative, the method includes, instead of the ion activation and bonding steps, the following steps:

deposition, on the surface of each of the encapsulation layer 130 and the lateral walls 125 opposite the first substrate 100, of a metal layer, bonding, by direct bonding of the metal layers thereof in an ultra-high vacuum chamber, of the encapsulation layer 130 in contact with the lateral wall 125 in order to provide atomic diffusion bonding.

For additional information on the above-mentioned atomic diffusion bonding, reference is made to the work of T. Shimatsu and M. Uomoto published in the scientific journal "Journal of Vacuum Science & Technology B", volume 28, page 706, 28 Jun. 2018.

As an alternative to surface-activated bonding, it may also be envisaged that the bonding of the encapsulation layer 130 on the lateral walls 125 is carried out by oxide-oxide direct bonding. According to such an alternative, not shown, the encapsulation layer 130 and the lateral walls 125 each have, at least on the portions that are placed in contact during bonding, an oxide layer, these oxide layers being of the same nature.

To promote the planarity of the encapsulation layer 130, the bonding step may optionally be carried out with a temperature differential between the first substrate 100 and the sacrificial substrate 150 so as to energize the encapsulation layer. This temperature differential may be between 10° C. and 150° C. and is preferably between 20 and 100° C., or approximately 50° C.

As an alternative to the steps of providing the first substrate 100, oxidizing the first substrate 100 and depositing the first semiconductor layer 103, a step of providing a SOI substrate is included, the insulating layer and the semiconductor layer of said SOI substrate respectively forming the first insulating layer 102 and the first semiconductor layer 103.

Figure 7A:
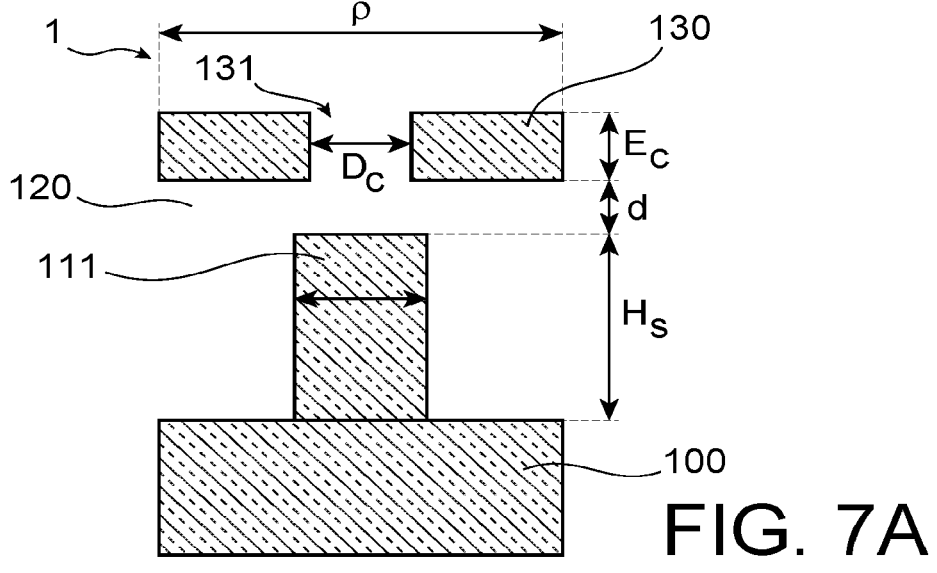
Figure 7B:
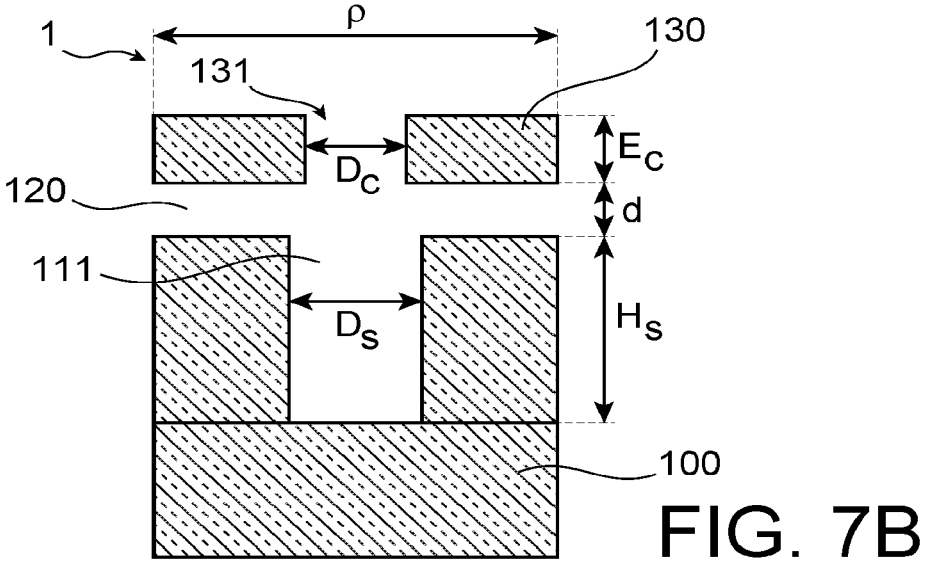

FIGS. 7A and 7B show two metasurface optical components 1 according to an embodiment in which the encapsulation layer 130 has a surface structuring 131 associated with each of the subwavelength structures 111.

A metasurface optical component 1 according to this second embodiment differs from a metasurface optical component 1 according to the first embodiment in that its encapsulation layer 130 includes, for each subwavelength structure 111, a surface structuring 131.

A surface structuring 131 takes the form of a circular through-opening formed opposite the corresponding subwavelength structure, for both the subwavelength structures having an axisymmetric cylindrical shape, as shown in FIG. 7A, and the subwavelength structures having an opening formed in a layer, as shown in FIG. 7B. According to this configuration, each opening can have a diameter substantially equal to $\lambda/2$, $\lambda$ being the median wavelength of the given wavelength range.

According to a first alternative of this second embodiment, not shown, the openings may be separate from the structures of the set of subwavelength structures 111.

According to a second alternative of this second embodiment, not shown, the surface structuring may take the form of a protuberance arranged on the surface of the encapsulation layer 130 located opposite the set of structures 111.

A manufacturing method according to this second method differs from a manufacturing method according to the first embodiment in that it includes an additional step of structuring the encapsulation layer 130 in order to form a surface structuring 131 for each of the structures.

Figure 8A:
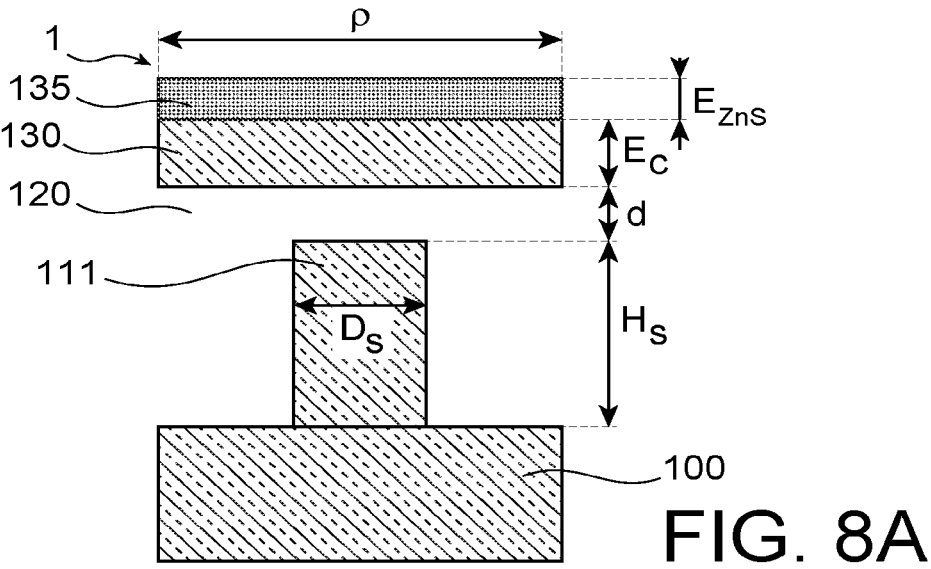
Figure 8B:
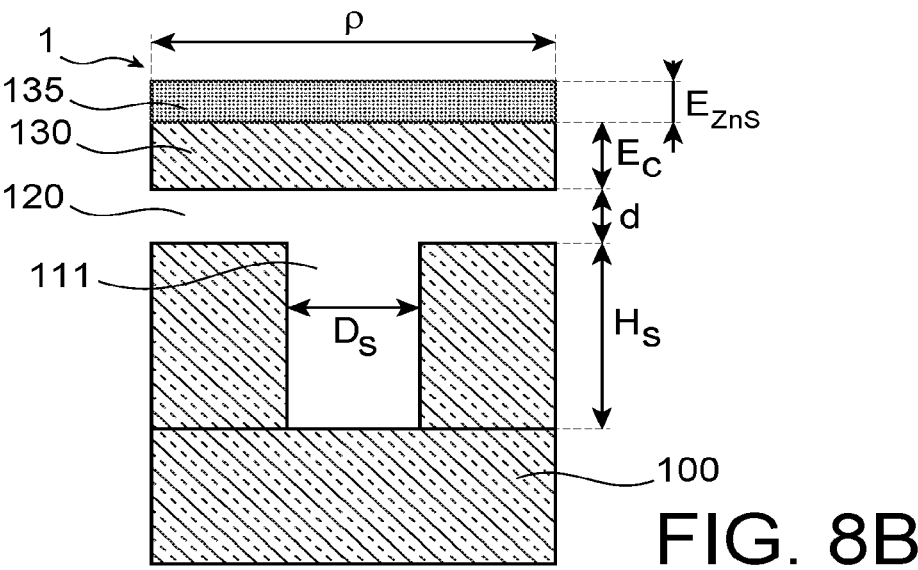

FIGS. 8A and 8B show two metasurface optical components 1 according to a third embodiment in which the metasurface optical component 1 also includes a layer 135, referred to as a coating layer, arranged in contact with a surface of the encapsulation layer 130, which is opposite to the set of subwavelength structures 111.

A metasurface optical component 1 according to this third embodiment differs from a metasurface optical component 1 according to the first embodiment in that it also includes a layer 135, referred to as a coating layer, arranged in contact with the surface of the encapsulation layer 130, which is opposite to the set of subwavelength structures 111, the coating layer 135 participating, with the encapsulation layer 130 and the encapsulated space, in the formation of the multilayer antireflective coating.

In this third embodiment, the coating layer 135 has a refractive index lower than the material of the encapsulation layer 130. Thus, this coating layer may be, for example, made of zinc sulfide ZnS, or zinc selenide ZnSe. The coating layer 135 participates, with the encapsulation layer 130 and the encapsulated space 120 in the formation of the multilayer antireflective coating of the metasurface optical component 1 according to the third embodiment.

Figure 9A:
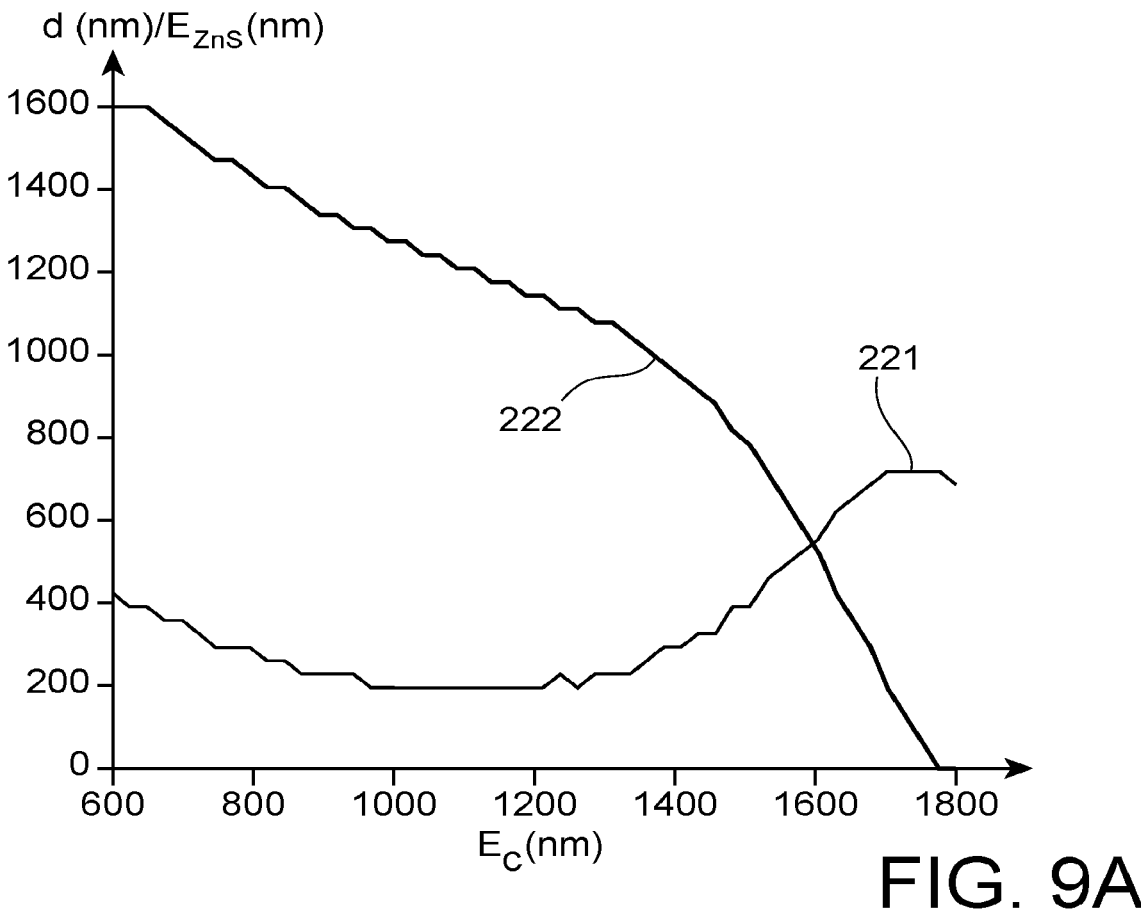
Figure 9B:
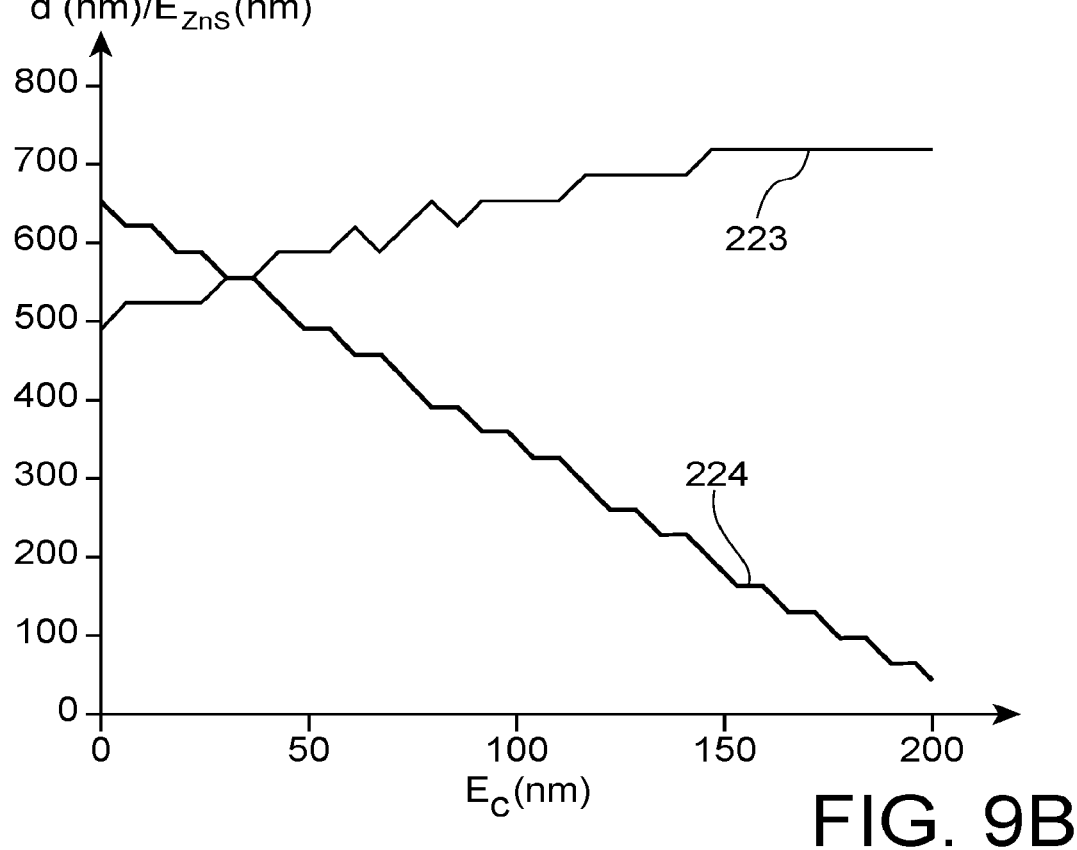

Of course, such a coating layer 135 participating in the formation of the multilayer antireflective coating, the thickness $E_{ZnS}$ thereof, the thickness of the encapsulation layer $E_C$ and the first distance must be adapted to provide such a function. To illustrate such an adaptation, FIGS. 9A and 9B show the variation, calculated by the inventors, in the thickness of the coating layer 135 (referenced 221 and 223, respectively, in FIGS. 9A and 9B), this layer being made of zinc sulfide ZnS, and the first distance d of the encapsulated space 120 (referenced 222 and 224, respectively, in FIGS. 9A and 9B) depending of the thickness of encapsulation layer $E_C$. FIGS. 9A and 9B both show a set of subwavelength structures 111 having an axisymmetric cylindrical opening shape formed in a silicon layer. Of course, these values are optimized and, in accordance with the invention, it is possible to provide a multilayer antireflective coating according to the invention with values close to that indicated in FIGS. 9A and 9B.

It should be noted that, for example, for a classic configuration of the coating layer 135, that is, for a zinc sulfide coating layer 135, a thickness $E_{ZnS}$ respecting the form $\lambda/4\lambda$, the following values may be used: a thickness $E_{ZnS}$ of the coating layer 135 of around 1.21 μm, a thickness of the encapsulation layer $E_C$ of around 1 μm and a first distance of around 0.2 μm.

Figure 10A:
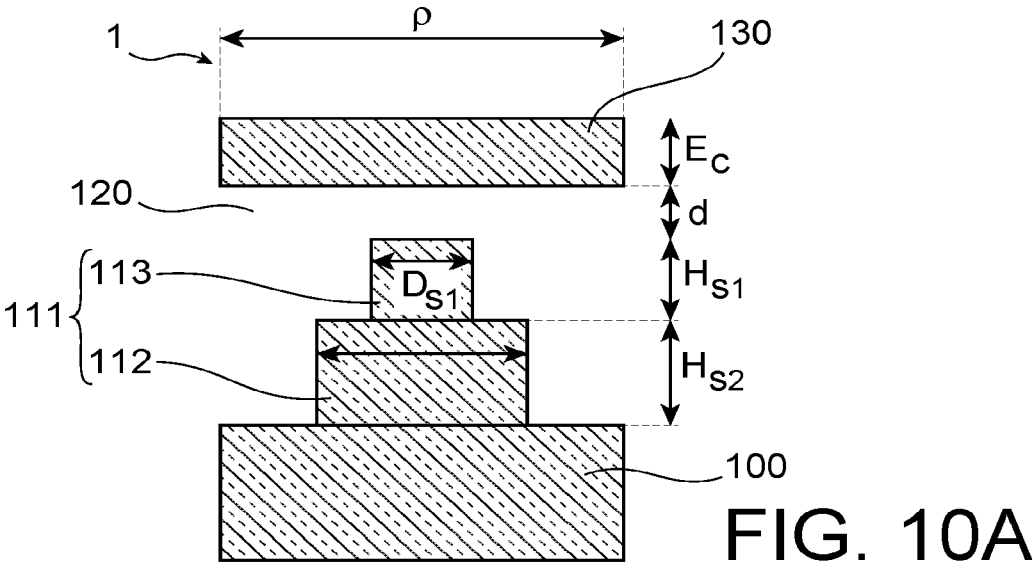
Figure 10B:
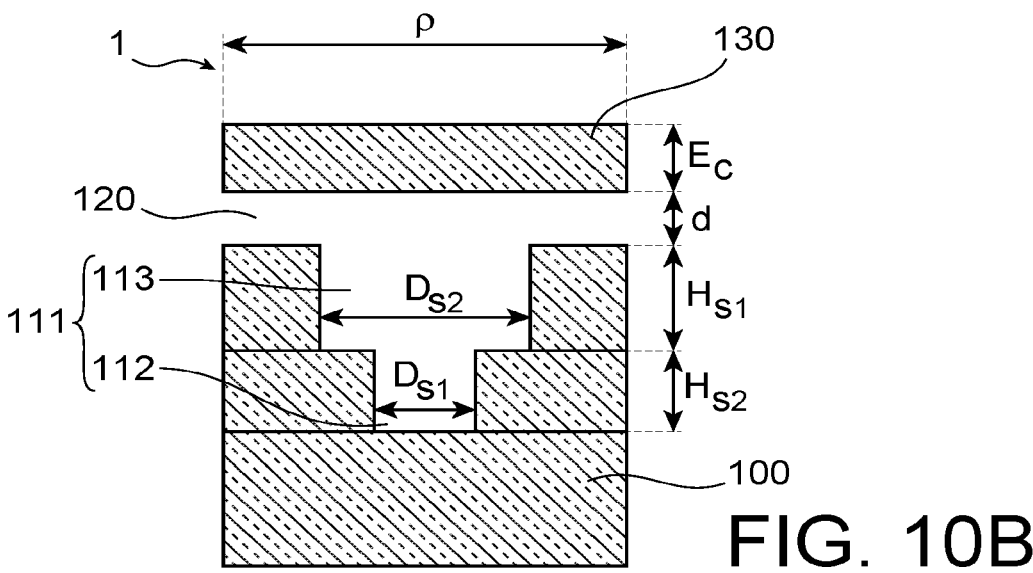

FIGS. 10A and 10B show two metasurface optical components 1 according to a fourth embodiment in which each subwavelength structure 111 has a configuration with two stages 112, 113.

A metasurface optical component 1 according to this fourth embodiment therefore differs from a metasurface optical component 1 according to the first embodiment in that each subwavelength structure 111 has a configuration with two stages 112, 113, a first stage 112 extending from the first surface of the first substrate 100 and a second stage 113 extending from the first stage 112 toward the encapsulation layer 130.

Thus, according to this fourth embodiment, if the subwavelength structures 111 have a cylindrical shape as shown in FIG. 9A, the first and second stages 112, 113 each have an axisymmetric cylindrical shape, respectively with a first diameter $D_{S1}$ and the second diameter $D_{S2}$ and being concentric, the second diameter $D_{S2}$ being smaller than the first diameter $D_{S1}$.

In the same way, with regard to the subwavelength structures 111 in the form of a cylindrical opening formed in a silicon layer, as shown in FIG. 9B, the first and second stages 112, 113 each have a cylindrical opening, respectively with a first diameter $D_{S1}$ and the second diameter $D_{S2}$ and being concentric, the second diameter $D_{S2}$ being smaller than the first diameter $D_{S1}$.

It should be noted that such an embodiment is described in order to illustrate that the invention is compatible with all metasurface optics regardless of the configuration of the subwavelength structures thereof. More specifically, if the present embodiment proposes subwavelength structures that have a variable cross-section in a direction perpendicular to the first surface of the first substrate 100, the invention is compatible with any type of subwavelength structure used in the context of metasurface optical components. Thus, as an alternative to this embodiment, it may also be envisaged, without going beyond the scope of the invention, that the subwavelength structures have other shapes and variables according to the teaching provided in the work of Sajan Shrestha and his coauthors published in the scientific journal *Light: Science & Applications*, volume 7, 2018, under article number 87.

Of course, if in the embodiments described above, the different layers, in particular the encapsulation layer and the first substrate, are made of semiconductor materials, such as silicon and germanium in the context of a given wavelength range in the mid-infrared, they may be different without going beyond the scope of the invention. It should be noted in particular that they may be, according to a routine practice of a person skilled in the art, optimized for the given wavelength range.

The invention claimed is:

1. A metasurface optical component, comprising:

a first substrate, and a set of subwavelength structures arranged on a surface of the first substrate to form a metasurface optical component in a given wavelength range, and the metasurface optical component further including an encapsulation layer that is substantially parallel to the surface of the first substrate, the encapsulation layer having a thickness and being spaced apart from the set of subwavelength structures by an encapsulated space over a first distance, wherein the thickness of the encapsulation layer and the first distance are adapted so that the encapsulation layer and the encapsulated space together form a multilayer antireflective coating in the given wavelength range, and the subwavelength structures of the set of subwavelength structures have at least one feature, selected from a geometric dimension and a second distance with respect to adjacent subwavelength structures, that varies along the surface of the first substrate.

2. The metasurface optical component according to claim 1, wherein the encapsulation layer is made of silicon or germanium and wherein the given wavelength range is an infrared wavelength range, the thickness of the encapsulation layer is between 50 and 250 nm, and the first distance is between 0.5 and 1.5 μm.

3. The metasurface optical component according to claim 1, comprising a coating layer, arranged in contact with a surface of the encapsulation layer that is opposite to the set of subwavelength structures, said coating layer being involved, with the encapsulation layer and the encapsulated space, in formation of the multilayer antireflective coating, the coating layer preferably being made of a material chosen from zinc sulfide and zinc selenide.

4. The metasurface optical component according to claim 1, wherein the encapsulation layer has a plurality of through-openings.

5. The metasurface optical component according to claim 4, wherein each through-opening is associated with a respective subwavelength structure with said through-opening aligned with a corresponding subwavelength structure.

6. The metasurface optical component according to claim 1, wherein the encapsulation layer has a surface structuring in a form of protuberances arranged on a surface of the encapsulation layer located opposite the set of subwavelength structures.

7. The metasurface optical component according to claim 1, wherein at least some of the subwavelength structures have, in a direction perpendicular to the surface of the first substrate, a variable cross-section.

8. The metasurface optical component according to claim 1, wherein the first substrate has on a second surface, opposite to the set of subwavelength structures, an antireflective layer for the given wavelength range.

9. A method for manufacturing a metasurface optical component comprising the following steps:

providing a first substrate, forming a set of subwavelength structures arranged on a first surface of the first substrate to form a metasurface optic in a given wavelength range, and providing an encapsulation layer, the encapsulation layer being substantially parallel to the surface of the first substrate and having a thickness, and the encapsulation layer being spaced apart from the set of subwavelength structures by an encapsulated space, over a first distance, wherein when providing the encapsulation layer, the thickness of the encapsulation layer and the first distance are adapted so that the encapsulation layer and the encapsulated space together form a multilayer antireflective coating in the given wavelength range, and the subwavelength structures of the set of subwavelength structures have at least one feature, selected from a geometric dimension and a second distance with respect to adjacent subwavelength structures, that varies along the surface of the first substrate.

10. The manufacturing method according to claim 9, wherein providing the encapsulation layer comprises:

forming at least one supporting element for supporting the encapsulation layer in contact with the first surface of the first substrate, each supporting element extending beyond the set of subwavelength structures by a height equal to the first distance, and bonding the encapsulation layer in contact with the at least one supporting element.

11. The manufacturing method according to claim 10, wherein bonding the encapsulation layer in contact with the at least one supporting element is chosen from:

surface-activated bonding, atomic diffusion bonding, and oxide-oxide direct bonding.

12. The manufacturing method according to claim 10, wherein in bonding the encapsulation layer in contact with the at least one supporting element the encapsulation layer and the at least one supporting element have a temperature differential.

13. The manufacturing method according to claim 12, wherein the temperature differential is between 10° C. and 150° C.

14. The manufacturing method according to claim 12, wherein the temperature differential is between 20° C. and 100° C.

15. The manufacturing method according to claim 10, wherein forming the at least one supporting element comprises:

forming a respective extension of each supporting element on the first surface of the first substrate, each extension extending over a height equal to the first distance, and localized etching of the first surface of the first substrate to form part of each supporting element and the subwavelength structures of the set of subwavelength structures.

16. The manufacturing method according to claim 15, wherein in providing the first substrate, a substrate including the first substrate, an insulating layer arranged in contact with the first substrate, and a semiconductor layer in contact with the insulating layer are provided, a sum of a thickness of the insulating layer and a thickness of the semiconductor layer being equal to the first distance, and forming the respective extension of each supporting element includes localized etching of the semiconductor layer and the insulating layer.

\* \* \* \* \*